United States Patent [19]
Hartmann et al.

[11] Patent Number: 5,479,810
[45] Date of Patent: Jan. 2, 1996

[54] METHOD FOR PRODUCING FORM WOUND STATOR COILS

[75] Inventors: Robert H. Hartmann; James A. Guerrein, both of Erie, Pa.

[73] Assignee: General Electric Company, Erie, Pa.

[21] Appl. No.: 352,937

[22] Filed: Dec. 9, 1994

Related U.S. Application Data

[62] Division of Ser. No. 202,847, Feb. 24, 1994, Pat. No. 5,394,720, which is a continuation of Ser. No. 891,871, Jun. 1, 1992, abandoned.

[51] Int. Cl.⁶ .................................................. B21D 7/12
[52] U.S. Cl. .................................. 72/302; 72/372
[58] Field of Search ........................ 72/372, 295, 298, 72/299, 301, 302; 140/92.1

[56] References Cited

U.S. PATENT DOCUMENTS

| | | | |
|---|---|---|---|
| 1,435,284 | 11/1922 | Fathauer | 72/295 |
| 2,506,219 | 5/1950 | James | 72/298 |
| 2,841,200 | 1/1958 | James | 72/298 |
| 2,962,076 | 11/1960 | Durham | 72/298 |
| 4,751,838 | 6/1988 | Voges | 72/302 |
| 4,922,741 | 5/1990 | Bridges et al. | 140/92.1 |
| 4,964,291 | 10/1990 | Otty | 29/596 |

FOREIGN PATENT DOCUMENTS

| | | | |
|---|---|---|---|
| 0107314 | 2/1984 | European Pat. Off. | 72/306 |
| 0135483 | 3/1985 | European Pat. Off. | |
| 0251207 | 7/1988 | European Pat. Off. | |
| 33896 | 11/1964 | German Dem. Rep. | |
| 169352 | 9/1984 | Japan | 72/301 |
| 385984 | 3/1965 | Switzerland | 72/301 |

OTHER PUBLICATIONS

Patent Abstract of Japan, vol. 9, No. 244 (E–346) 30 Sep. 1985, JP 60–96154 (A) (Sakurai), 28 Oct. 1983.

*Primary Examiner*—Daniel C. Crane
*Attorney, Agent, or Firm*—Ann M. Agosti; Marvin Snyder

[57] ABSTRACT

Apparatus for forming a form wound stator coil from a bobbin has means for clamping the straight portions of the bobbin to define the straight portions of the each leg of the coil. It also has means for bending the bobbin to predetermined radii to form arms extending from the straight portions of each leg of the coil to each nose of the coil. Means are provided for bending each arm to a predetermined radius. Means are further provided for bending the nose portions to a predetermined angle. Means for providing a drop to the arm portions of the coil relative to the stator bore are also provided. Means for forming the leads of the bobbin to a predetermined configuration are also provided. Hydraulic means for powering the apparatus and a system for controlling the hydraulic means are also disclosed.

4 Claims, 24 Drawing Sheets

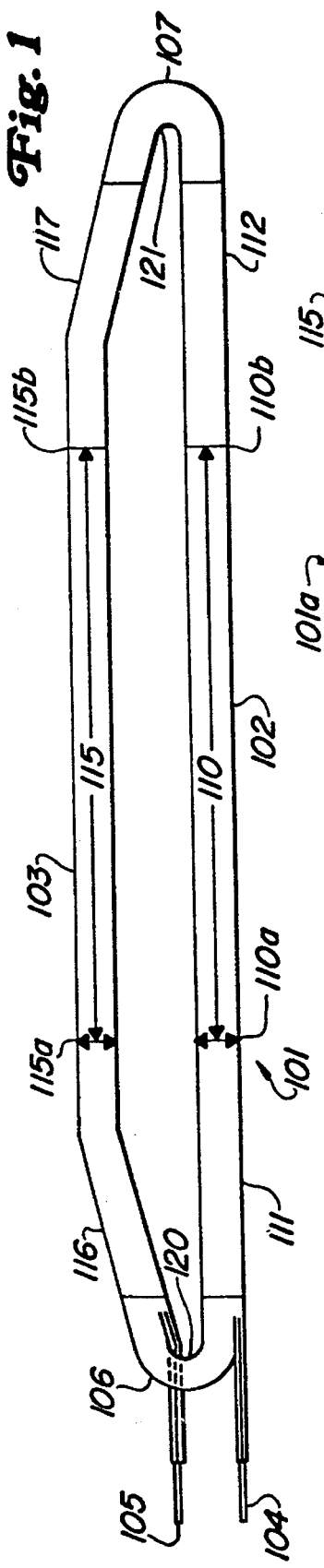
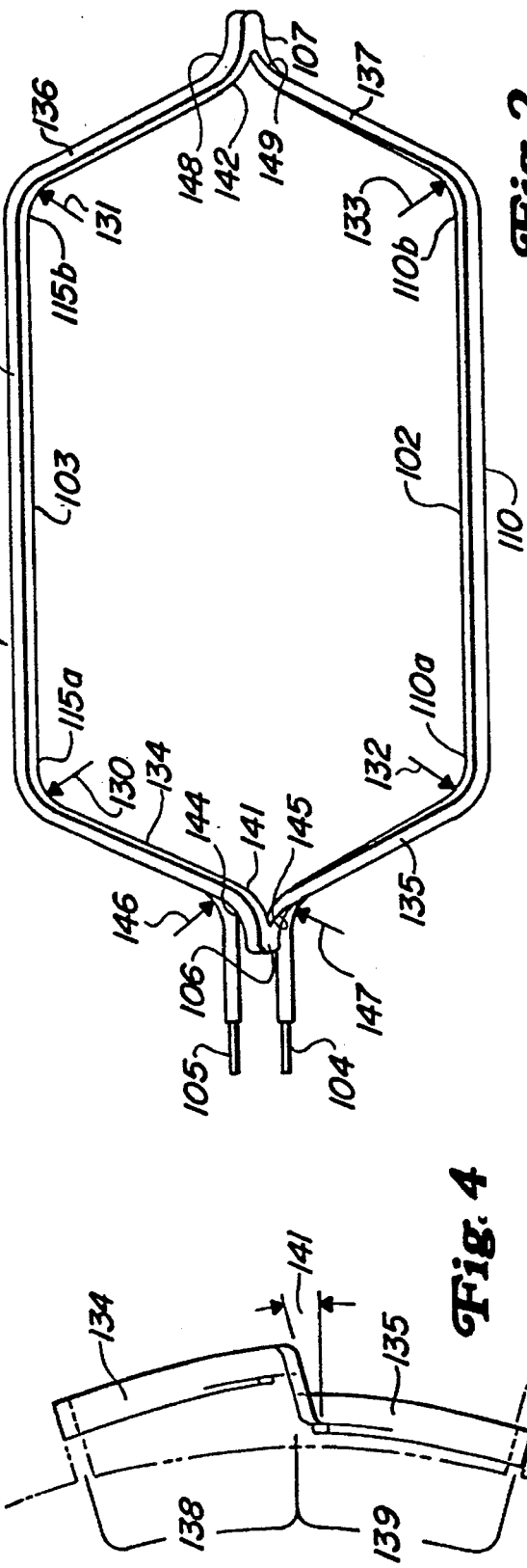
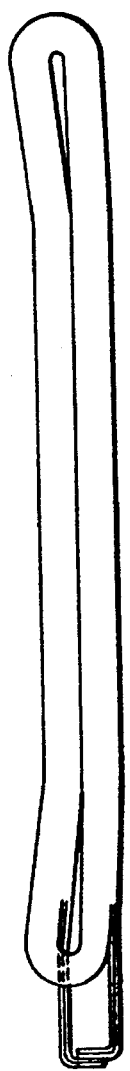

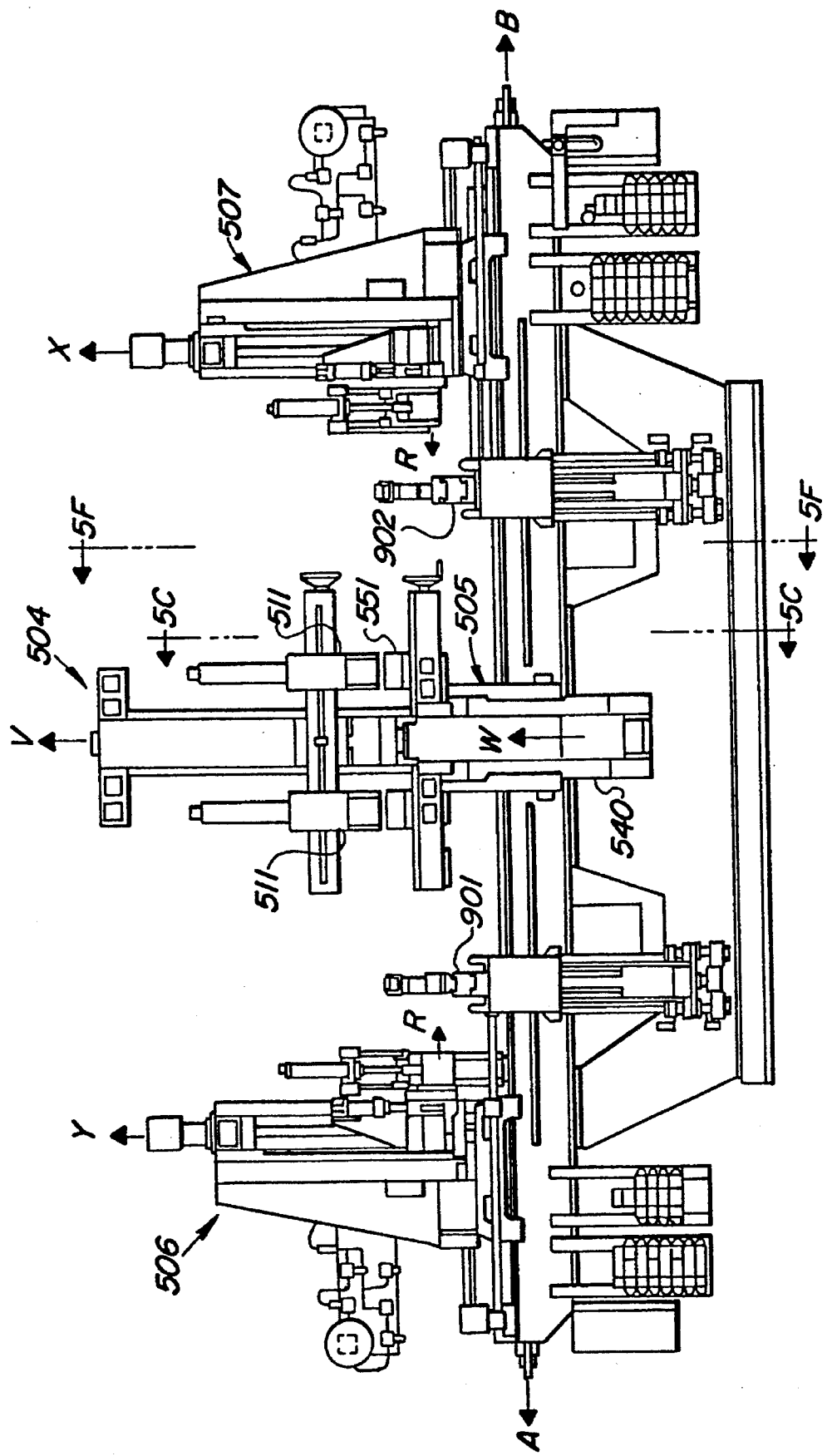

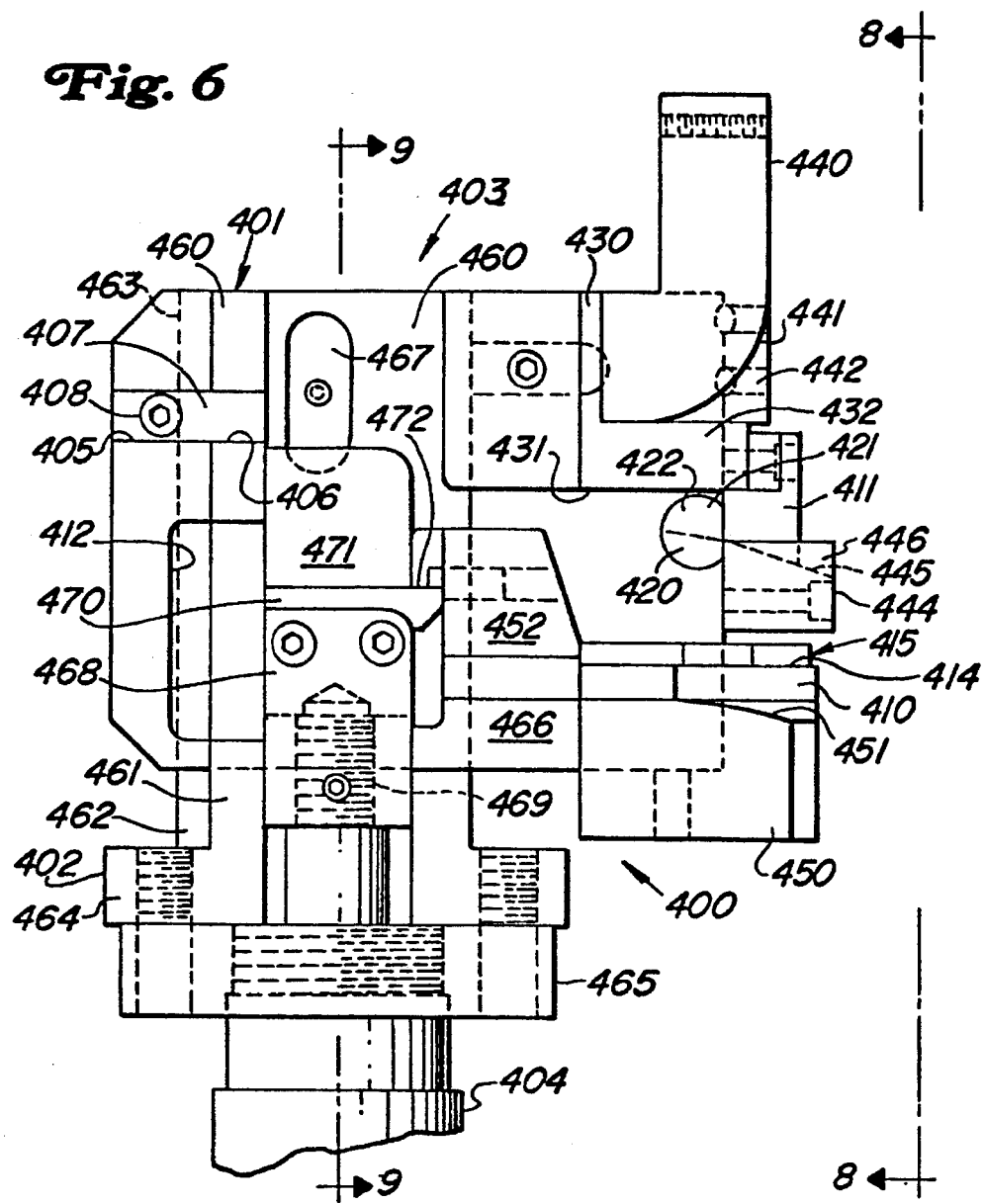
Fig. 6
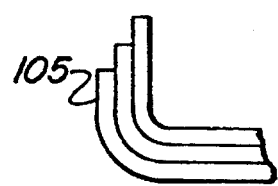
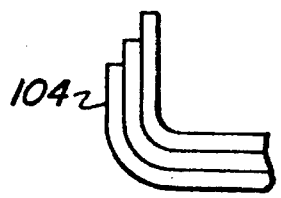

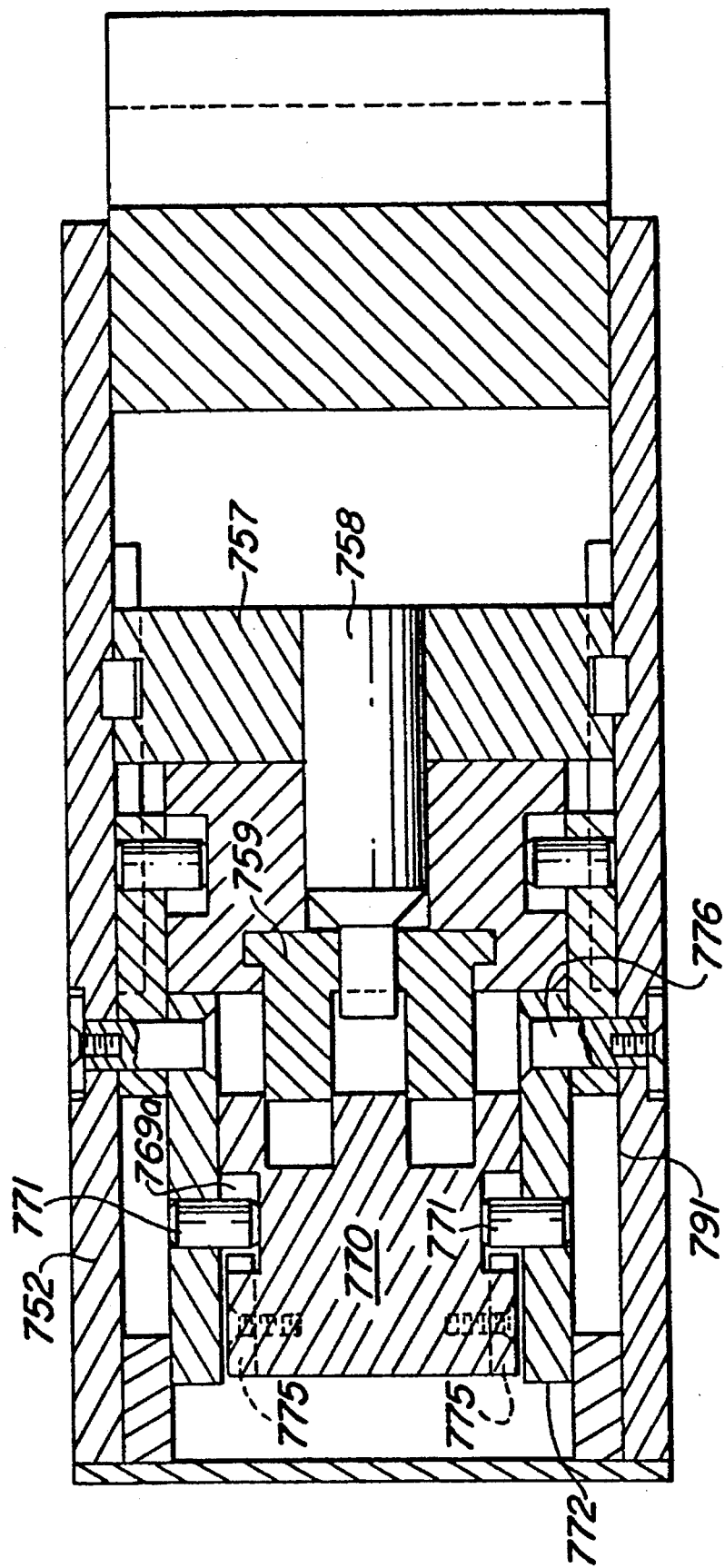

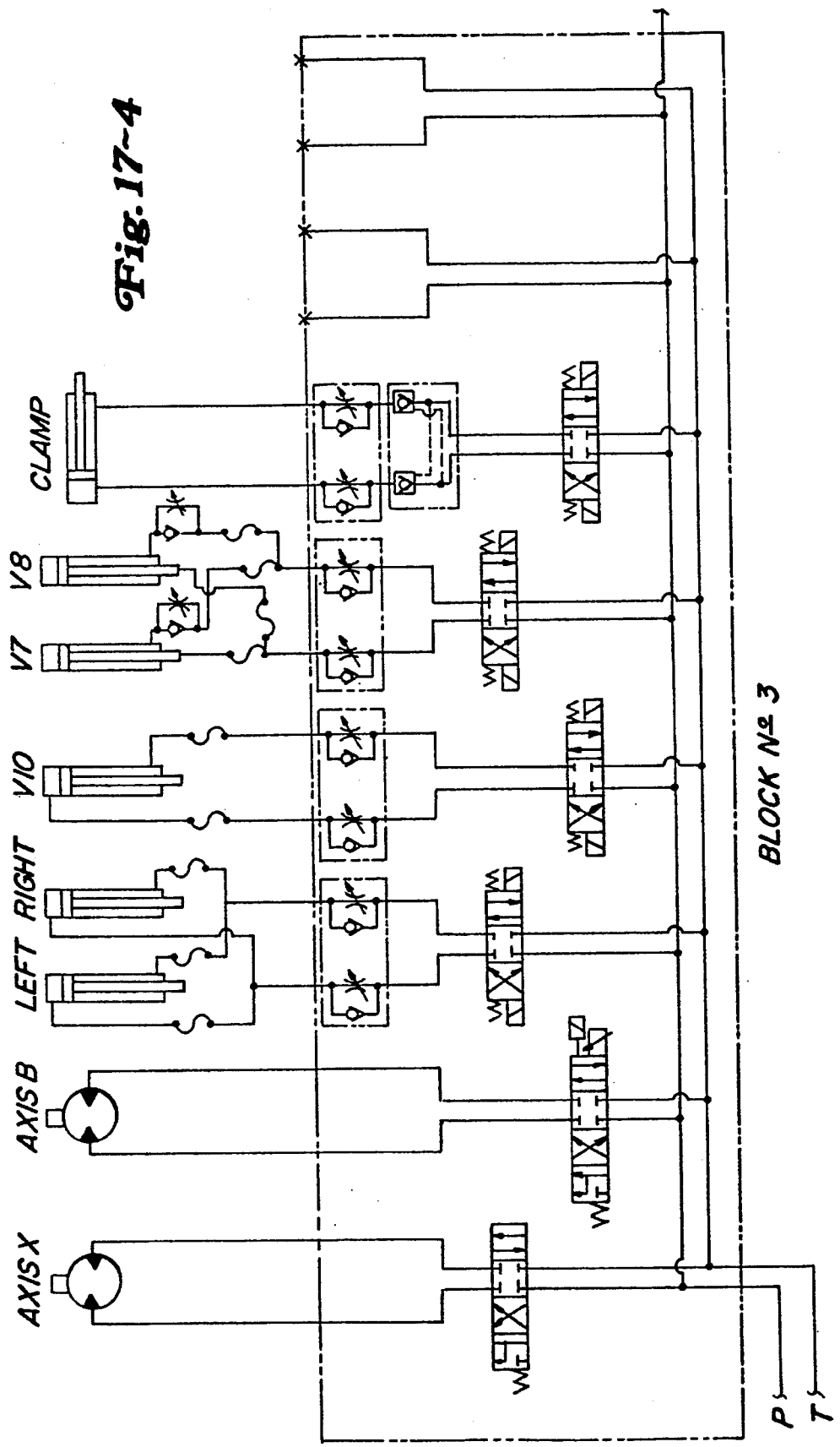

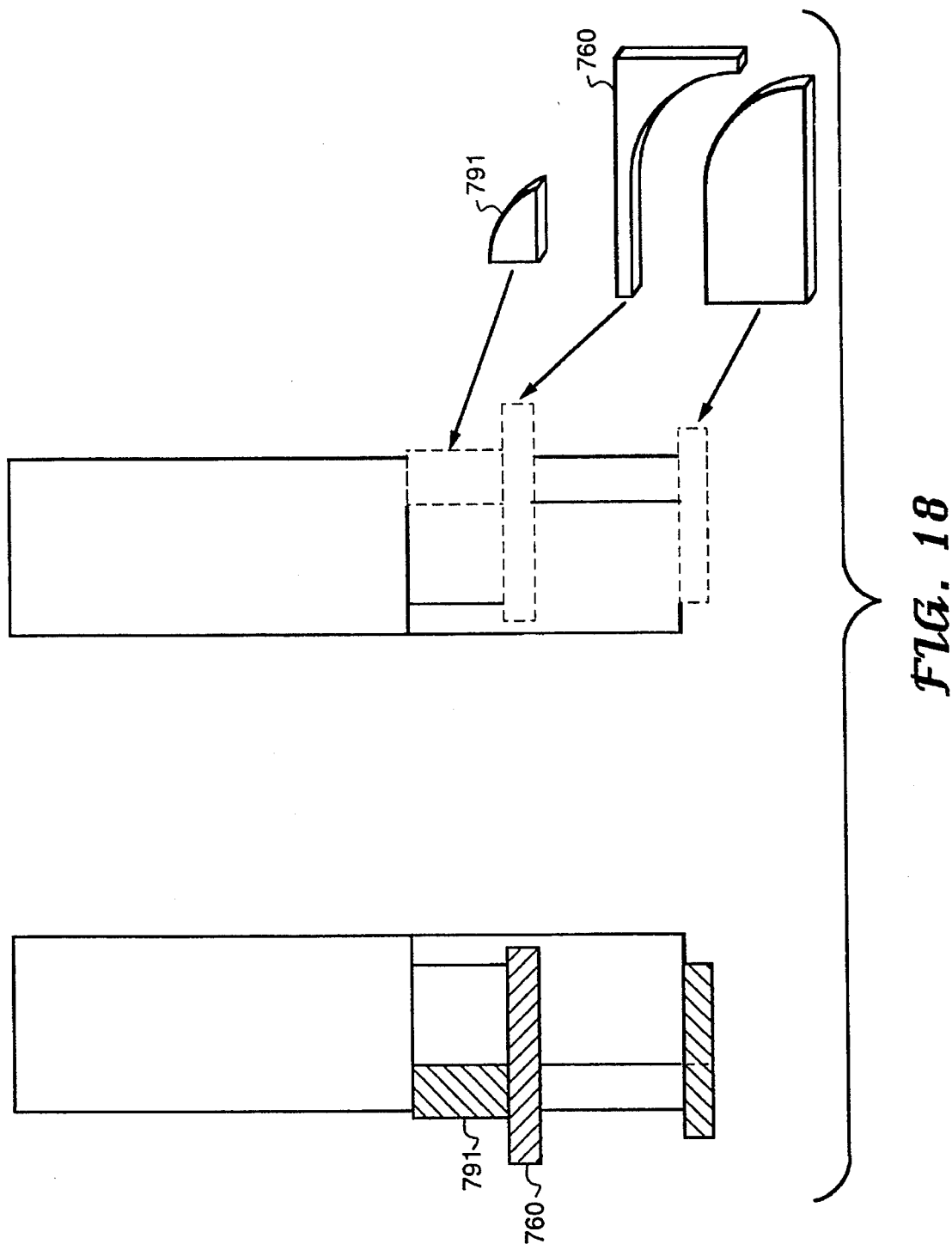

1

METHOD FOR PRODUCING FORM WOUND STATOR COILS

This application is a division of application Ser. No. 08/202,847, filed Feb. 24, 1994, now U.S. Pat. No. 5,394,720, which is a File Wrapper Continuation of 07/891,871 filed Jun. 1, 1992 (now abandoned).

TECHNICAL FIELD

This invention relates to a method and apparatus for producing form wound stator coils from a predesigned bobbin.

BACKGROUND PRIOR ART PROBLEM

Form wound stator coils are made from "bobbins", which consist of a number of turns of copper wire which may be in a prescribed form which relates to the final desired configuration of the stator coil.

Previously, making form wound stator coils was a labor intensive operation. Bobbins of insulated copper wire were formed to an approximate coil shape on crude manually run machines and then hammered into the desired shape. One disadvantage of that process was that repeatedly hammering the bobbin resulted in some degradation of the properties of the copper wire and turn insulation. Another disadvantage was that it took as long as 15 minutes to shape the bobbin into the prescribed shape of the stator coil. Further, it was difficult to produce coils within close tolerances, and poorly shaped coils are difficult to insert into the stator coil and often cause damage which results in future motor failures. Coil forming machines are known which pivot about a center axis equivalent to a center axis of the stator core to stretch bobbins. However, such known machines typically require manual control of grippers and are not generally adapted to form leads of the bobbins. In addition, such machines typically do not have rotational nose end clamps to properly form nose ends of the bobbins.

Attempts have been made to construct apparatus to shape bobbins in desired coil configurations. Prior to this invention, no such apparatus has been available to completely configure a bobbin to the desired stator coil configuration.

SUMMARY OF THE INVENTION

It is an object of this invention to create an apparatus which is capable of completely forming a form wound stator coil from a bobbin.

It is another object of this invention to create an apparatus which is capable of completely forming form wound stator coils having a variety of dimensions with a minimal change in tooling.

It is another object of this invention to create an apparatus which is capable of completely forming a form wound stator coil in such a manner which minimizes or eliminates degradation or work hardening of the copper wire in the bobbin.

It is another object of this invention to create an apparatus which is capable of mass producing form wound stator coils having little, if any, meaningful variation in tolerances, and to produce such coils at the rate of about one minute per coil or less.

In one form of the invention, apparatus is provided for forming a form wound stator coil from a bobbin. The bobbin from which the form wound stator coil is formed has a lower leg including a straight length portion and two nose end arms, and an upper leg including an upper leg straight length portion and two nose end arms, a lead end nose defining a lead end inner nose radius, an opposite lead end nose defining an opposite lead end inner nose radius, and leads.

The apparatus includes lower leg clamping means for clamping the lower leg of the bobbin to maintain the lower leg straight length arm portion substantially in its original shape and for forming a radius of predetermined dimensions between the straight length portion and the lower leg nose end arms, and lower leg clamp positioning means for initially positioning the lower leg clamping means on at least the opposite ends of the lower leg straight length arm portion.

The apparatus also includes upper leg clamping means for clamping the upper leg of the bobbin to maintain the upper leg straight length arm substantially in its original shape and for forming a radius of predetermined dimensions between the straight length portion and the upper leg nose end arms, and upper leg clamp positioning means for initially positioning the upper leg clamping means on at least the opposite ends of the upper leg straight length arm.

The apparatus also includes pivoting means for pivoting the lower leg clamping means and pivoting means for pivoting the upper leg clamping means, both pivoting means being pivoted about an axis equivalent to the center axis of the stator core into which the finished coil will be inserted.

Lead end clamping means are provided for securing the lead end nose, and opposite lead end clamping means are provided for securing the opposite lead end nose in a fixed position.

First and second positioning means are provided for positioning the lead end and opposite lead end clamping means with respect to the dimensions of the bobbin, Further, first and second pressure means are provided for selectively applying pressure against the first and second positioning means, and the pressure is directed generally outwardly from the center of the apparatus.

Operation means are provided for pivoting the lower leg clamping means to a first predetermined angle and for pivoting the upper leg clamping means to a second predetermined angle and for activating the first and second pressure means to apply a predetermined amount of pressure and flow so that the lower leg clamping means and the upper leg clamping means reach their respective predetermined angles substantially simultaneously.

Encoder means are also provided for providing feedback to control means of the positions of the lower leg clamping means, the lower leg clamp positioning means, the upper leg clamping means, the upper leg clamp positioning means, the pivoting means, the lead end clamping means, the opposite lead end clamping means, the first and second positioning means, and for providing feedback to control means of the status of the operation means.

Position indication means are provided for visually depicting the lateral spacing between each of the lower leg clamping means and between each of the upper leg clamping means for setting those clamps to a distance equal to the straight length portion of each leg of the bobbin.

Control means are provided for controlling the operation means to position and move the lower leg clamping means, the lower leg clamp positioning means, the upper leg clamping means, the upper leg clamp positioning means, the lead end clamping means, the opposite lead end clamping means, and the first and second positioning means in a predetermined manner so that the clamps can be initially positioned to receive a bobbin having predetermined dimensions, and so that the clamps can close to secure the bobbin, and so that the clamps can be moved and rotated to produce a formed coil having predetermined dimensions.

Means are also provided for securing individual strands of wire in the lead end nose from becoming misaligned with respect to one another, and means are also provided for securing individual strands of wire in the opposite lead end nose from becoming misaligned with respect to one another.

Arcing means are also provided for arcing the arms of the upper and lower legs to a predetermined radius. Additional means are provided for configuring the leads to a predetermined configuration.

In another aspect of this invention, a method is provided for forming a form wound stator coil from a bobbin. The lower and upper legs of the bobbin are clamped proximate to the opposite ends of their straight length portions to maintain the straight length portions to predetermined dimensions.

The lead end nose, the leads, and the opposite lead end nose are also clamped and maintained in a free floating relationship against an applied pressure of from about 10 pounds per square inch to about 25 pounds per square inch, or preferably about 15 pounds per square inch. As will be understood by those skilled in the art, the pressure can be varied, depending on the forces applied to the bobbin during core forming operation. Ideally, the pressure applied to the nose clamps is sufficient to cause the nose clamps to smoothly move inward toward each other as the legs are rotated outward from one another.

The lower and Upper legs are rotated outward to a predetermined angular relationship from one another about an axis equivalent to the center axis of the stator core into which the finished coil will be inserted. At approximately the same time a radius of predetermined dimensions is formed between the straight length portion and the lower leg nose end arms, and radii are formed between the lead end and opposite lead end noses and the upper and lower nose end arms proximate to said noses. Those radii are formed by radial tools disposed on the outside ends of the clamps which maintain the straight length portions of the coil.

The noses are rotated to a predetermined angle, and the noses are raised to the desired "drop" (the angular position of the noses relative to a line tangent to the teeth of the stator core which permits sufficient clearance for the rotor to be inserted in the stator core after the coils are inserted into the slots of the stator core).

In preferred embodiments of the method, radii are formed on the upper and lower nose end arms. Further the leads are formed to a predetermined configuration. In addition, the lower and upper legs are rotated outward to a predetermined angular relationship from one another in a smooth, continuous motion to minimize degradation of the copper wire in the bobbin.

In another aspect of this invention, a control system is provided for operating an apparatus for producing a form wound stator coil having a predetermined configuration from a bobbin having a predetermined configuration and dimensions. The control system is provided with means for inputting bobbin and coil dimension data and clamp position data. It also comprises operator controlled means for selectively generating apparatus operating command signals, such as signals for positioning the means operable on the bobbin to receive a bobbin, and signals for causing the means operable on the bobbin to operate on the bobbin to form coils and for causing the means operable on the bobbin to release the formed coil to permit its removal from the apparatus. The control system is provided with means for interpreting feedback signals from the encoder means. It also includes a variable program control means for receiving and interpreting bobbin and coil dimension data, encoder input signals and operating command signals. The control system further includes means for generating commands in a preselected sequence to the operation means responsive to the variable program control means to actuate the operation means to position the means operable on the bobbin to receive the bobbin, to actuate the means operable on the bobbin to form the coil to predetermined dimensions, and to actuate the means operable on the bobbin to permit removal of the formed coil from the apparatus.

The present invention is a very significant advance over any prior art known to applicants. With the present invention, one operator can generate a coil from a bobbin in less than a minute, and ideally in 45 seconds or less. Prior methods took 15 minutes to perform the same operation. Further, the coils formed by the present invention are uniform and have much closer tolerances than was possible using prior apparatus. In addition, the copper wire in the coils formed by the present invention is not subject to nearly as much mechanical degradation as in the prior art method, where the bobbin had to be hammered— a significant amount in some cases—to form a coil, resulting in mechanical degradation of the properties of the copper wire and also in some damage to the wire insulation.

The present invention will be better understood and its various advantages will be more fully appreciated from the following description taken in conjunction with the accompanying drawings.

THE DRAWINGS

FIG. 1 is a sketch of a bobbin used in the present invention.

FIG. 2 is a sketch of a finished form wound stator coil made from the bobbin in FIG. 1.

FIG. 3 is a side view of the finished form wound stator coil shown in FIG. 2.

FIG. 4 is an end view of the finished form wound stator coil shown in FIG. 2

FIG. 5A is a front view showing the major components of another embodiment of an apparatus for the present invention.

FIG. 6 is a front view of the back section of the head block of the lead end nose clamp showing the cylinder rod in the extended position and also showing how the leads of the bobbin are bent by the removable tools used in that clamp.

FIG. 12B is a top view taken along line A—A of FIG. 12.

FIGS. 17-1 through 17-6 are schematic drawings of a hydraulic system which may operate the apparatus shown in FIGS. 5–16.

FIG. 18 is an exploded front view of the upper leg clamp assembly of FIG. 12.

DETAILED DESCRIPTION

Figures 1, 17:
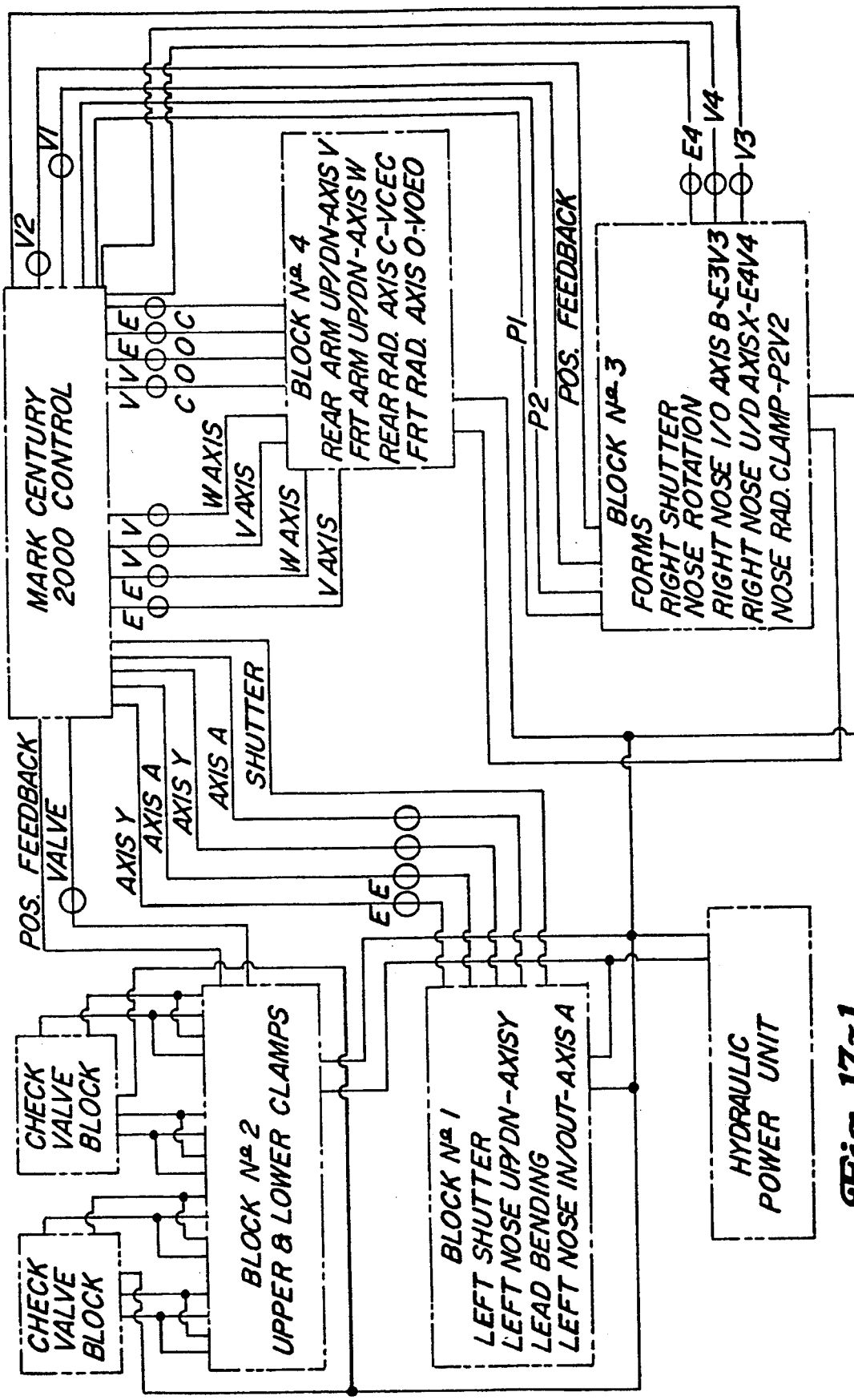

The present invention converts bobbins into form wound stator coils. The dimensions of the bobbin are a function of the final designed geometry of the form wound stator coils. A bobbin used in the present invention is schematically shown in FIG. 1. Bobbin 101 comprises at least one turn of insulated copper wire which has been wound in the configuration shown in FIG. 1. Bobbin 101 has a lower leg 102, an upper leg 103, leads 104 and 105, a lead end nose 106, and an opposite lead end nose 107. Lower leg 102 includes a coil straight length portion 110, which extends between lines 110A and 110B which is equal in length to the total straight length of the finished coil, and nose end arms 111 and 112. Upper leg 103 includes a coil straight length portion 115, which extends between lines 115A and 115B and which is equal in length to the total straight length of the finished coil, and nose end arms 116 and 117.

As will be explained in more detail below, bobbin 101 is placed in clamps in coil forming apparatus 501 shown in FIG. 5. The coil forming apparatus of this invention spreads the bobbin to form the finished form stator coil having the configuration shown in FIGS. 2–4.

Figures 2, 17:
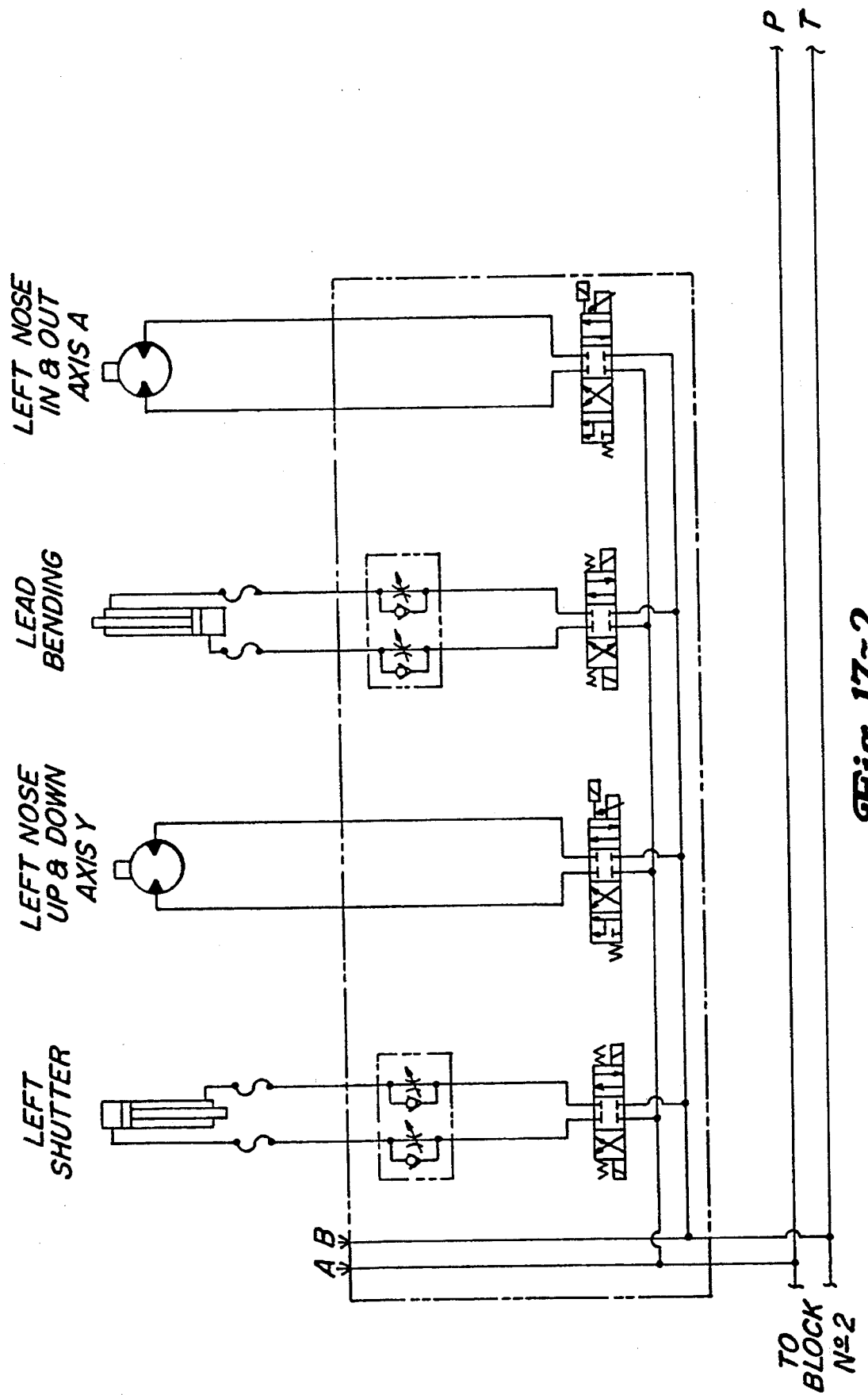
Figures 3A, 17:
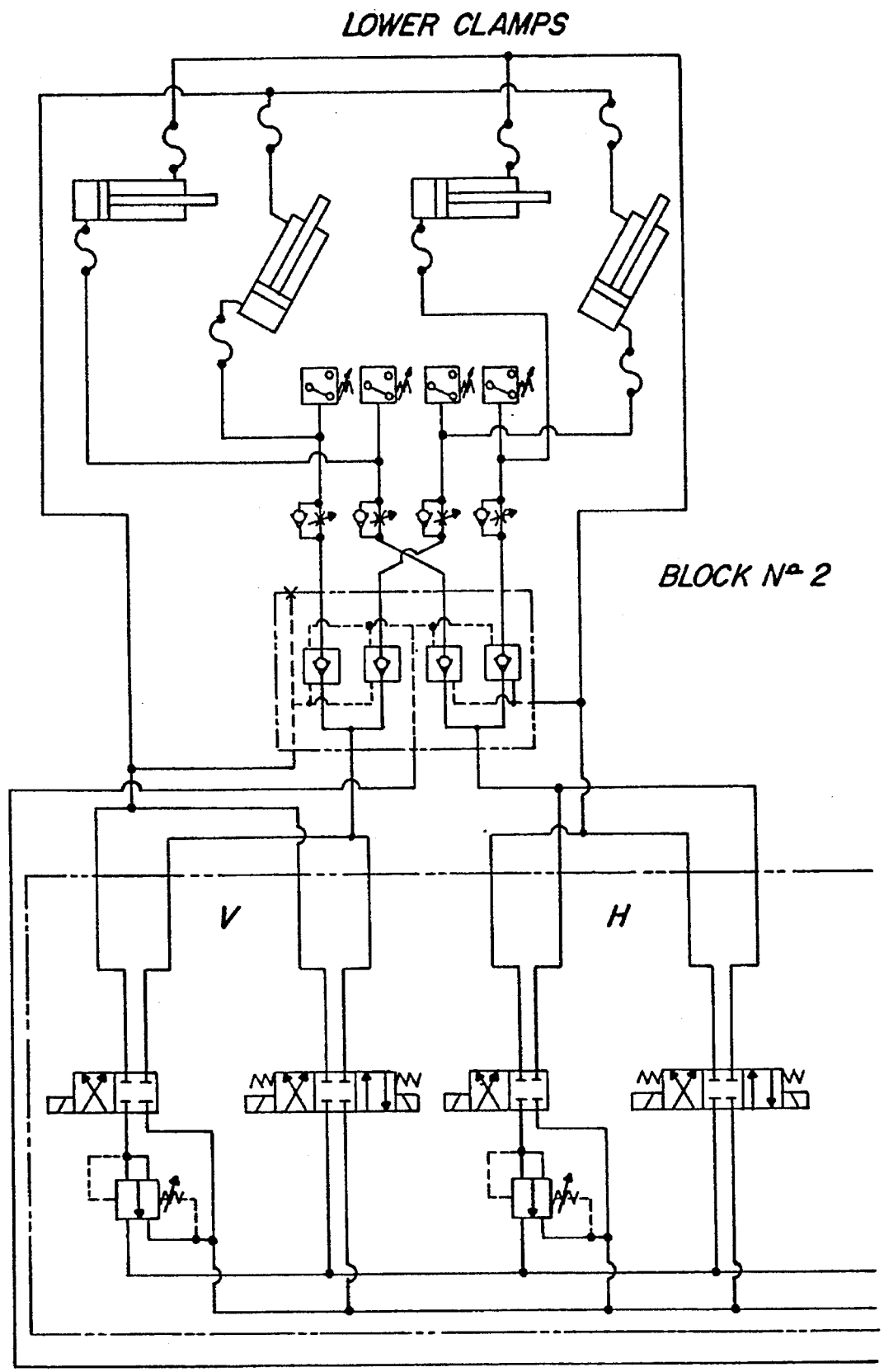
Figures 3B, 17:
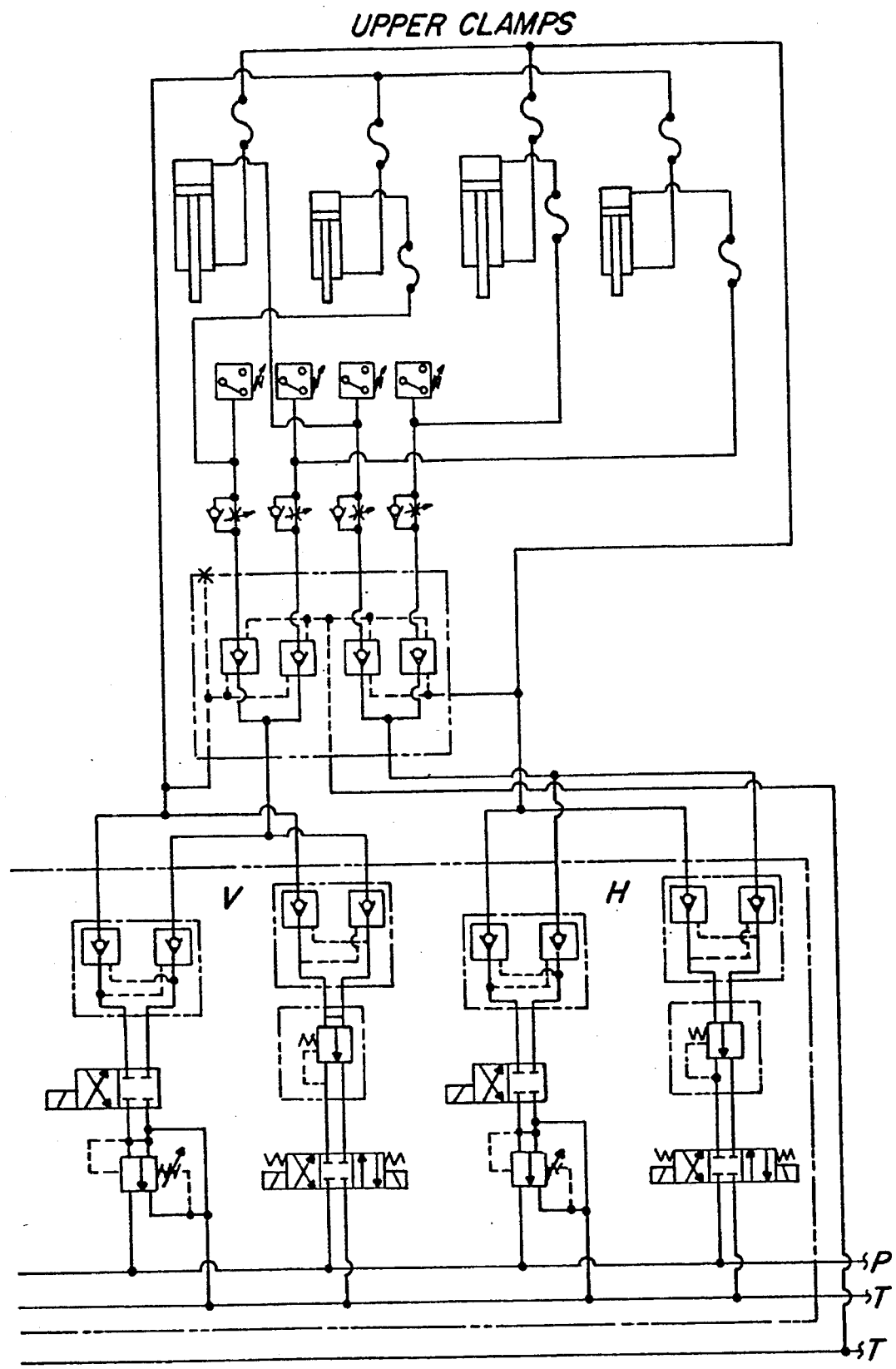
Figures 5, 17:
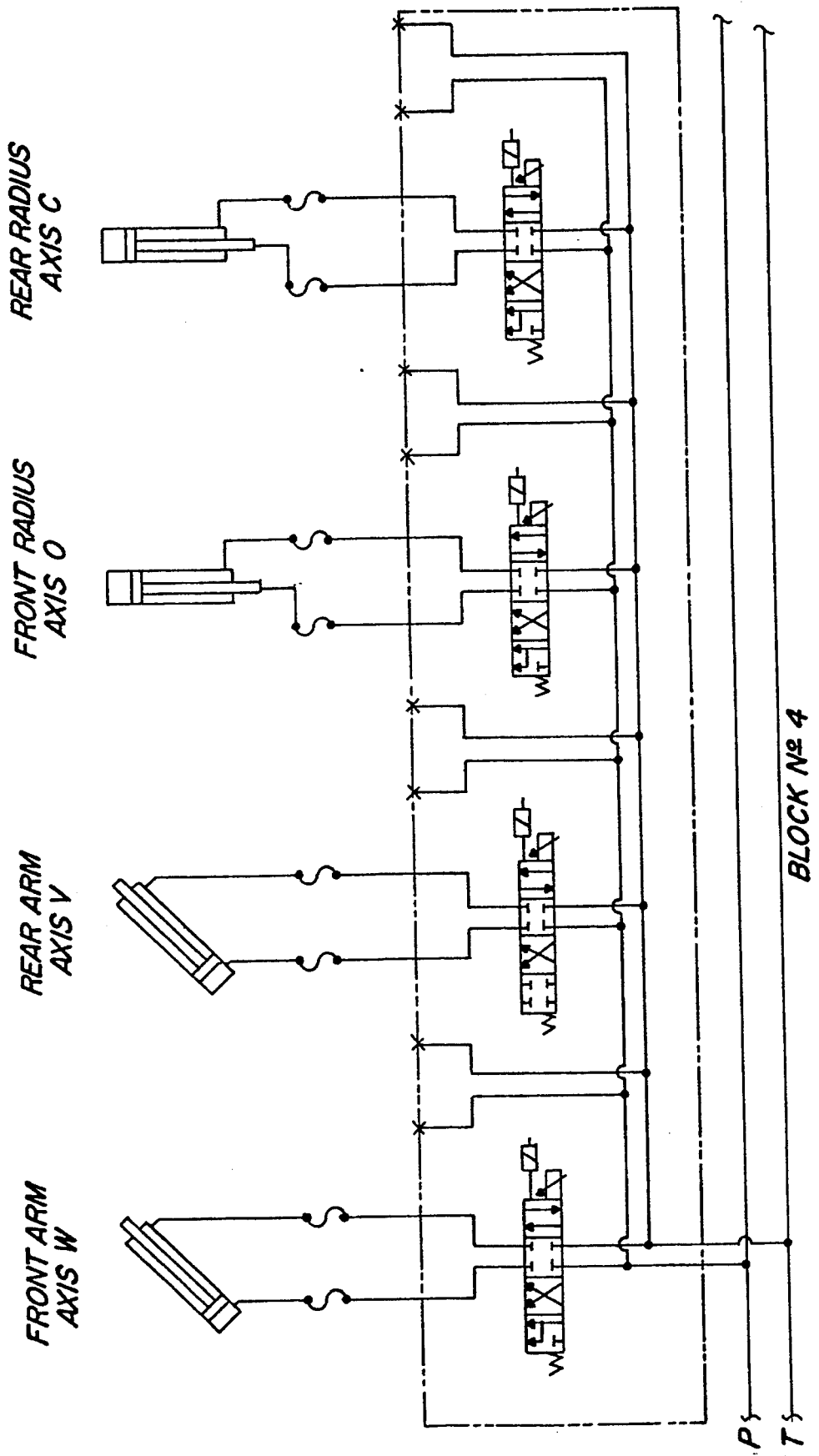

FIG. 2 is a sketch of a coil formed by the apparatus of this invention. As is discussed below, upper and lower leg clamps 531 and 551, respectively, spread legs 102 and 103. FIG. 3 is a side view of the coil, and FIG. 4 is and end view.

Figure 5:
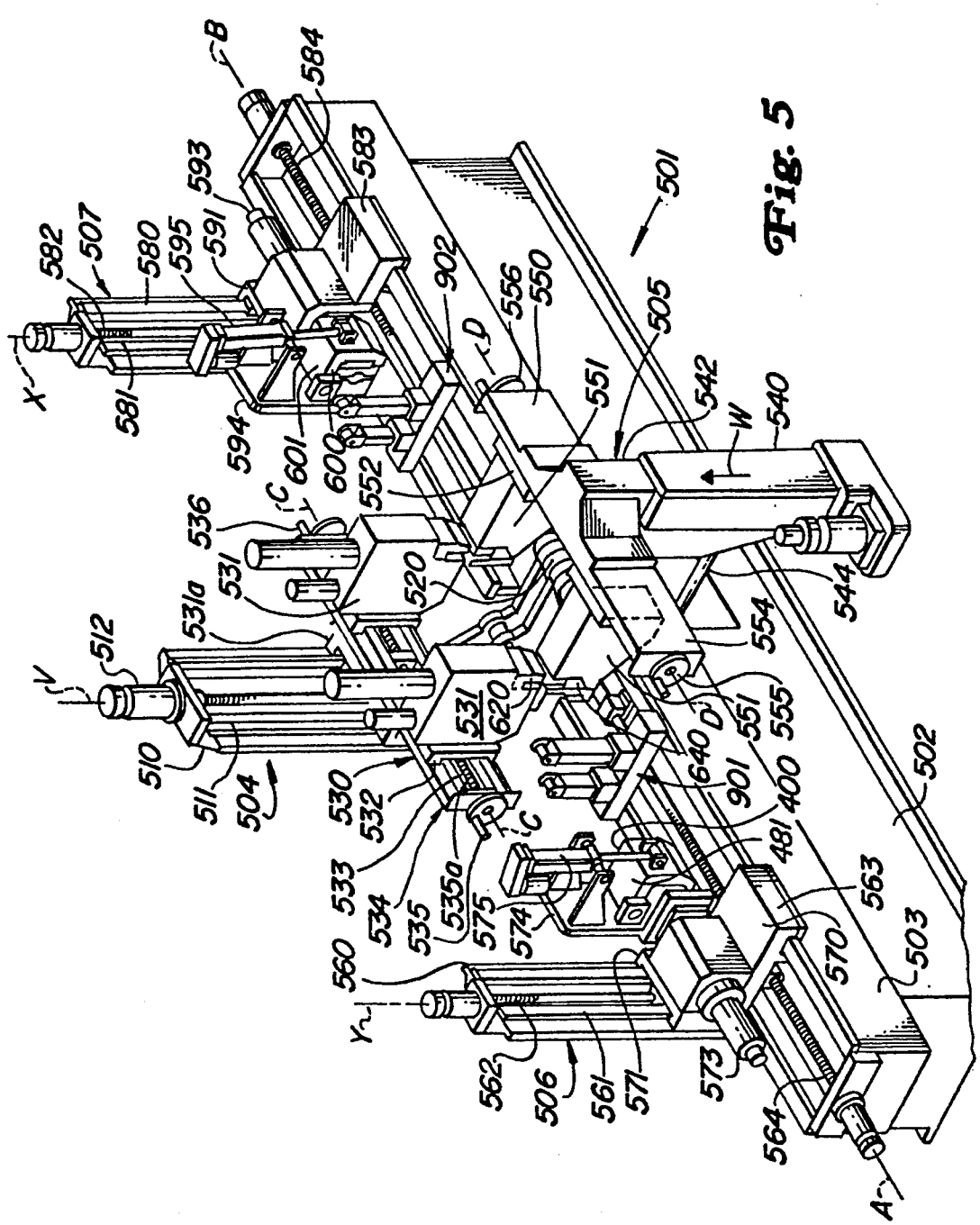
FIG. 5 is a drawing showing an elevational view of the major components of one embodiment of an apparatus of the present invention.
Figure 5C:
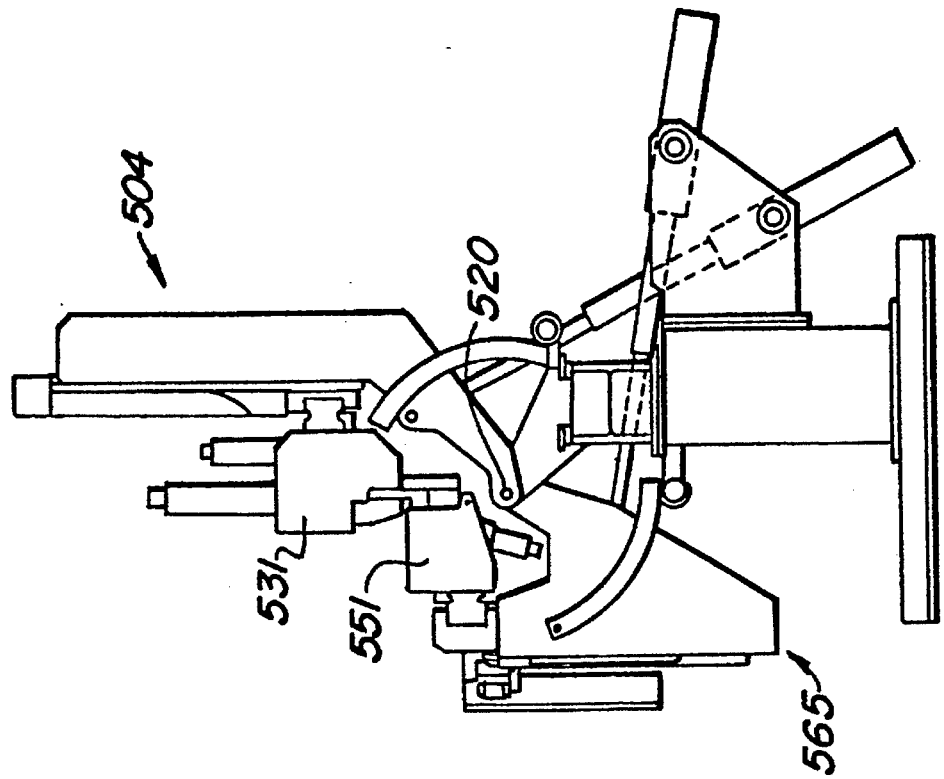
FIG. 5C is a side view through line A—A of FIG. 5A.
Figure 5B:
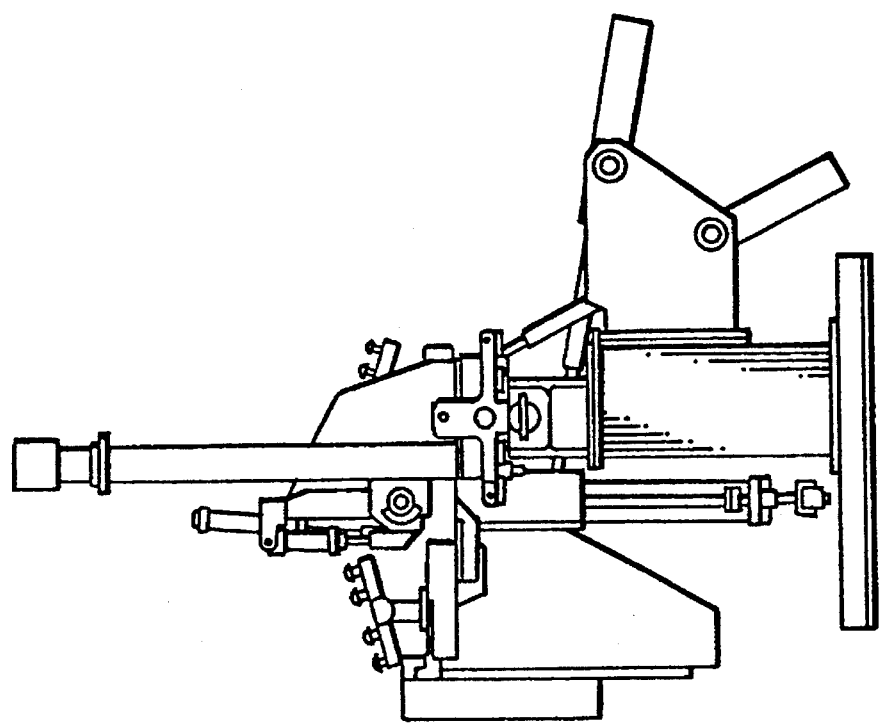
FIG. 5B is a side view of some of the components of the apparatus in FIG. 5A through line F—F.

As shown in FIG. 5, the major components of coil forming apparatus 501 include base 502, base drive housing 503, upper bobbin leg clamp assembly 504, lower bobbin leg clamp assembly 505, lead end nose clamp assembly 506, and opposite lead end nose clamp assembly 507.

Upper bobbin leg clamp assembly 504 includes tower frame 510 which is provided with tracks 511 and drive shaft means 512. Tower frame 510 is pivotally connected to pivot 520, and tower frame 510 may be pivoted about pivot 520 by hydraulic drive means or other suitable means which are well known to those skilled in the art. Position encoding means, not shown but known to those skilled in the art, are disposed to indicate the angle to which tower frame has been rotated about pivot 520.

Tower drive unit 530 is mounted in driving relationship with drive shaft means 512 and includes slot units 531a in locked sliding engagement with tracks 511. Tower drive unit 530 thus may be moved up and down tower frame 510 along the "V" axis, which runs through drive shaft 512. Position encoding means, not shown but known to those skilled in the art, are disposed to indicate the position of tower drive unit 530 on tower frame 510.

Tower drive unit 530 is provided with upper leg clamps 531 which are slidably interlocked by track engaging units 532 to tracks 533 on transverse drive assembly 534 which moves upper leg clamps along axis "C", which is transverse to the "V" axis of tower frame 510. Transverse drive assembly includes one or more screw drives or other suitable means for moving clamps 531 to their desired position. In the embodiment shown, clamps 531 move simultaneously outward from center or inward toward center by manually turning either handle 535 or 536, which respectively drive screw 535A which is half right handed and half left handed thread. A position indicator (not shown) is disposed on the assembly to indicate the position of each of the clamps 531 on transverse drive assembly 534. That position is input into the control system of the invention. Alternatively, position encoding means may be used to automatically feed the position to the control means.

Figure 12:
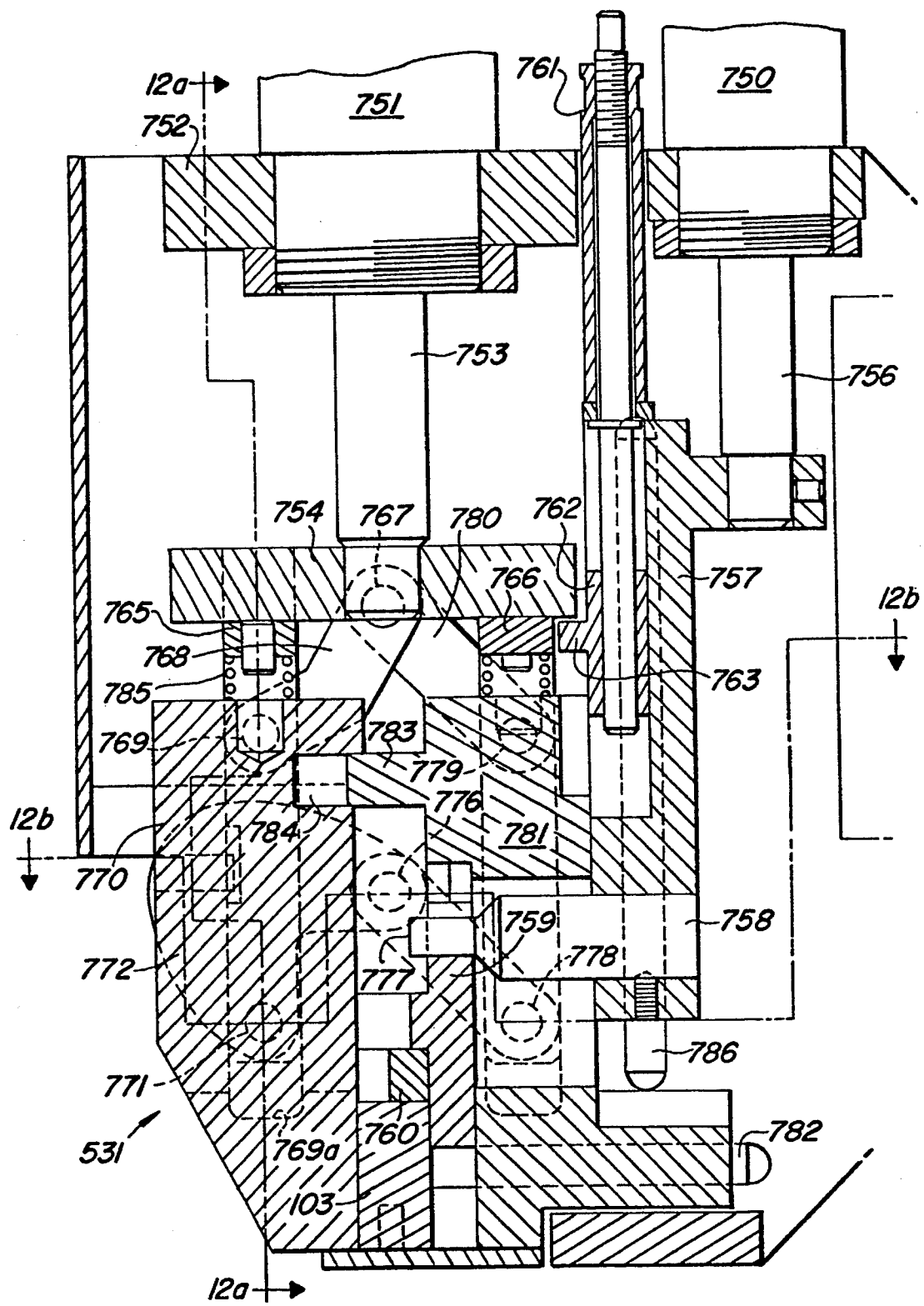
FIG. 12 is a side cross sectional view of the upper leg clamp assembly.
Figure 12A:
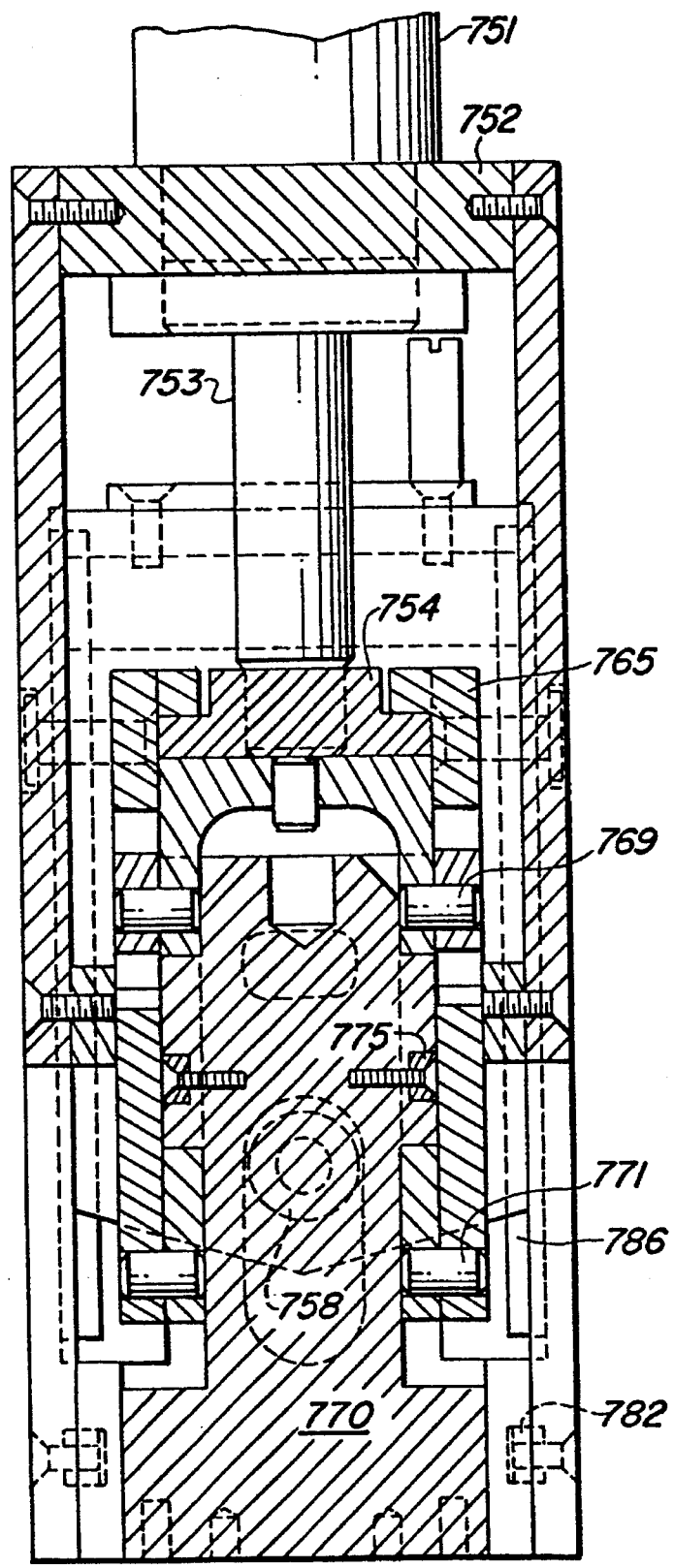
FIG. 12A is a front cross sectional view taken along line C—C of FIG. 12.

Upper leg clamps 531 are four sided clamps which are adapted to engage upper leg 103 of bobbin 101. As is shown in FIG. 12, which is a side view of the upper leg clamp assembly 531 and associated apparatus, upper leg clamp assembly 531 includes two hydraulic cylinders; front cylinder 751 and back cylinder 750. Front cylinder 751 is mounted on frame 752. Front cylinder rod 753 is connected to plate 754, which is connected to generally U-shaped brackets 765 which is better viewed on FIG. 12A and 766, which is shown in FIG. 12. Frame pin 767 is connected to link 768, which in turn is connected through pin 769 to U-bracket 765. U-bracket 765 slides in a slot 769a in shutter 770. Pin 771 is also connected at the lower end of U-bracket 765. Pin 771 is also connected to link 772. Link 772 and link 768 impart a rotational to linear motion, so that when rod 753 of cylinder 751 is retracted, shutter 770 is lifted forward and upward about the links and thus opens to permit insertion or removal of upper leg 103 of bobbin 101. As is shown in FIG. 12B, retaining keys 775 are disposed in shutter 770 to enable U-bracket 765 to pull shutter 770 into its retracted or open position.

Referring to FIG. 12, link 772 is also connected to frame pin 776, which is also connected to link 777. Link 777 rotates about frame pin 776, and is also connected to pin 778. Pin 778 is located in back U-frame 766. Pin 779 is also located in U-frame 766. Link 780 is connected to pin 779 and to pin 767. Rear jaw 781 is in sliding relation on key 786.

When rod 753 is extended, it closes the shutter 770 by imparting a rotational to linear motion through U-frame 765 which pivots about links 768 and 772 which close shutter 770. When rod 753 is extended, links 780 and 777 impart linear motion to rear jaw 781, which has an integral key 783, which mates with slot 784 in shutter 770 to lock shutter 770 and jaw 781 together.

Die springs 785 disposed between U-frames 765 and 766 and shutter 770 and rear jaws 781 aid in the unclamping cycle when the shutter 770 is opened (i.e., when rod 753 is retracting).

Back cylinder 750 has rod 756, which is connected to slide 757, which is guided by keys 786. Pin 758 is connected to slide 757 and extends frontward and is connected at its opposite end to top jaw 759 on which clamping tool 760 is removably secured. As shown in FIG. 18, clamping tool 760 is generally L shaped, having a radially shaped inner surface. Tool 760 may be configured to match the dimensions of the bobbin 101 placed in the clamp. Thus, by forming a number of different sized tool 760 parts, upper clamp 531 may engage and clamp different sized bobbins. Cylinder rod 756 moves tool 760 up and down. When the bobbin is placed in the clamp, tool 760 is in the up position, and when the clamp closes, tool 760 is forced down on the upper arm 115 of the bobbin 101 to secure it in the clamp.

Adjustable pin 761 is connected to stop block 762, which has flange 763 disposed to engage plate 754 to stop relative movement between the upper and lower parts of clamp 531.

Referring to FIG. 5, lower bobbin leg clamp assembly 505 includes support frame 540 and drive shaft 542 which is driven by motor or hydraulic means (not shown) which are well known to those skilled in the art. Drive frame 542 is driven along axis "W" in support frame 540. Support frame 540 is pivotally connected to pivot 520, and support frame 540 may be pivoted about pivot 520 by hydraulic drive means, such as hydraulic drive shaft 544 or other suitable means which are well known to those skilled in the art. Position encoding means, not shown but known to those skilled in the art, are disposed to indicate the angular position of support frame 540 as it is rotated on pivot 520.

Drive frame 542 is provided with lower leg clamps 551 which are slidably interlocked by slot units 552 to tracks (not shown) on transverse drive assembly 554 which moves upper leg clamps along the "D" axis, which is transverse to the "W" axis of support frame 540. Transverse drive assembly 554 is secured to drive frame 542. Position encoding means, not shown but known to those skilled in the art, are disposed to indicate the position of transverse drive assembly along the "W" axis of support frame 542.

Transverse drive assembly includes a screw drive or other suitable means for moving clamps 551 to their desired position. In the embodiment shown, clamps 551 are moved independently and manually by turning drive handles 555 or 556. A position indicator (not shown) is disposed on the assembly to indicate the position of each of the clamps 551 on transverse drive assembly 554. That position is input into the control system of the invention. Alternatively, position encoding means may be used to automatically feed the position to the control means.

Figure 13:
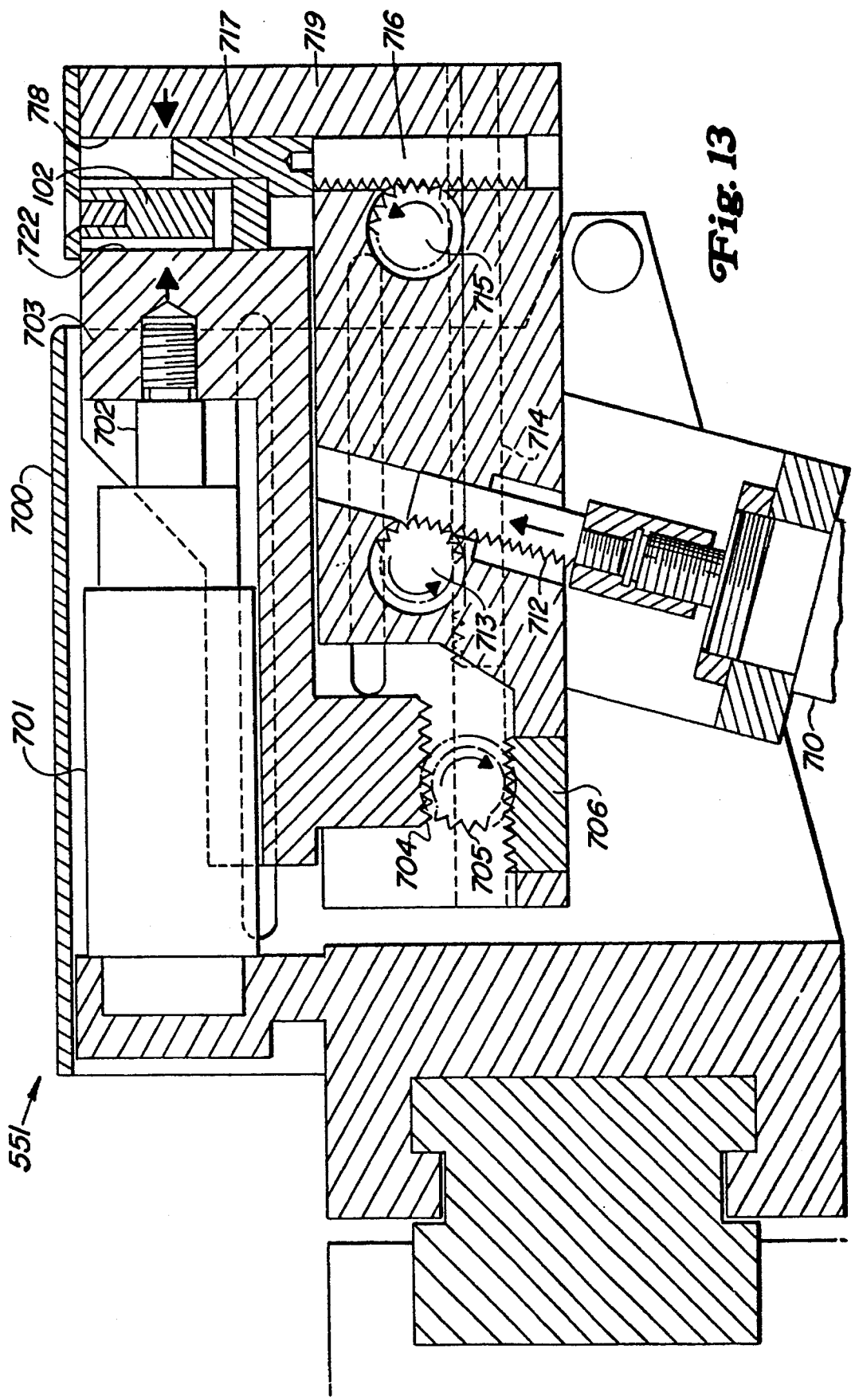
FIG. 13 is a cross sectional side view of lower leg clamp 551.

Lower leg clamps 551 are four sided clamps which are adapted to engage lower leg 102 of bobbin 101. FIG. 13 is a cross sectional side view of lower leg clamp 551 and associated parts. Lower leg clamps include chassis 700, which houses hydraulic cylinder 701 having cylinder rod or plunger 702 in driving connection with upper jaw 703. On the lower part of jaw 703 is a gear 704 that drives pinion 705. Pinion 705 is geared to lower jaw 706. Thus, when plunger 702 moves, upper and lower jaws move toward or away from each other.

Figure 14:
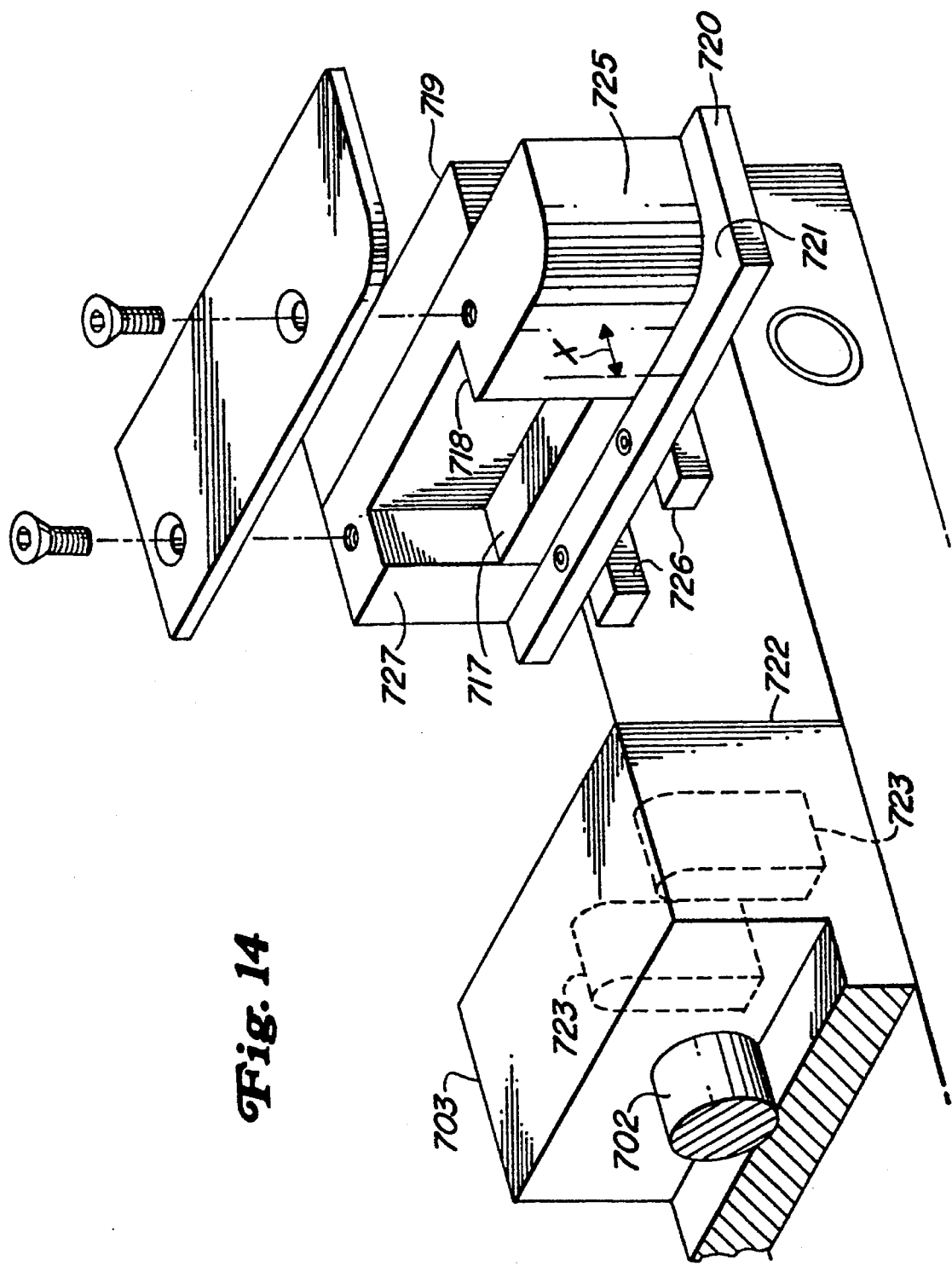
FIG. 14 is a partially exploded elevational view of lower leg clamp 551.

Hydraulic cylinder 710 is secured to the lower Jaw 706 and moves with the lower jaw. Cylinder 710 has rod 711 connected to rack 712 which drives pinion 713. Pinion 713 drives rod 714 which in turn drives pinion 715 which drives rod 716 which drives movable front jaw 717 into position to secure the lower leg 102 of bobbin 101. As is shown in FIG. 14, sliding jaw 717 slides up and down in slot 718 defined by front jaw 719. The end of front jaw 719 at the side closest to the nearest nose is provided with cylindrically shaped radius block 725 which is adapted to form a radius on the lower bobbin leg near the closest nose to form the arms on the lower bobbin leg, as can be appreciated from FIGS. 1 and 2. When placed in the clamp, lower leg 102 of bobbin 101 sits the upper surface 721 of shelf 720, which is secured to guides 726 of jaw 717. The "x" dimension of shelf 720 as shown in FIG. 14 is slightly less than the thickness of the wire in the bobbin so that the front face 722 of upper jaw 703 clamps the bobbin against the opposing face of jaw 719 when the clamp is closed. Front face 722 of jaw 703 is provided with slots 723 which receive guides 726. Shelf 721 and radius forming block 725 can be changed, depending on the dimensions of the bobbin and the desired dimensions of the stator coil formed by the apparatus 501.

Referring back to FIG. 5, lead end nose clamp assembly 506 includes tower frame 560 which is provided with tracks 561 and drive shaft means 562. Tower frame 560 includes a track riding unit 563 for moving tower frame along the "A" axis of the base drive screw 564 in the base drive housing. Track riding unit 563 is thus mounted in driving relationship on drive shaft means 564, which may be a screw or other suitable means known to those skilled in the art. Encoding means, not shown but known to those skilled in the art, are disposed in tower frame 560 to indicate its position on the "A" axis relative to pivot point 520.

Tower drive unit 570 is mounted in driving relationship with drive shaft means 562 and includes slot units 571 in locked sliding engagement with tracks 561. Tower drive unit 570 thus may be moved up and down tower frame 560 along the "Y" axis, which runs through drive shaft 562. Position encoding means, not shown but known to those skilled in the art, are disposed to indicate the position of tower drive unit 570 on tower frame 560.

Tower drive unit 570 also includes a rotational drive shaft 573 mounted generally transverse to drive shaft means 562 and mounted parallel to the axis through pivot 520. Lead end nose clamp housing 574 is rotationally mounted on rotational drive shaft 573. Lead end nose clamp housing 574 includes a hydraulic cylinder or other suitable means for opening and closing upper clamping head block 481 on lead end nose clamp 400. Position encoding means, not shown but known to those skilled in the art, are disposed to indicate the angular degree to which lead end nose clamp housing assembly is rotated.

Figure 7:
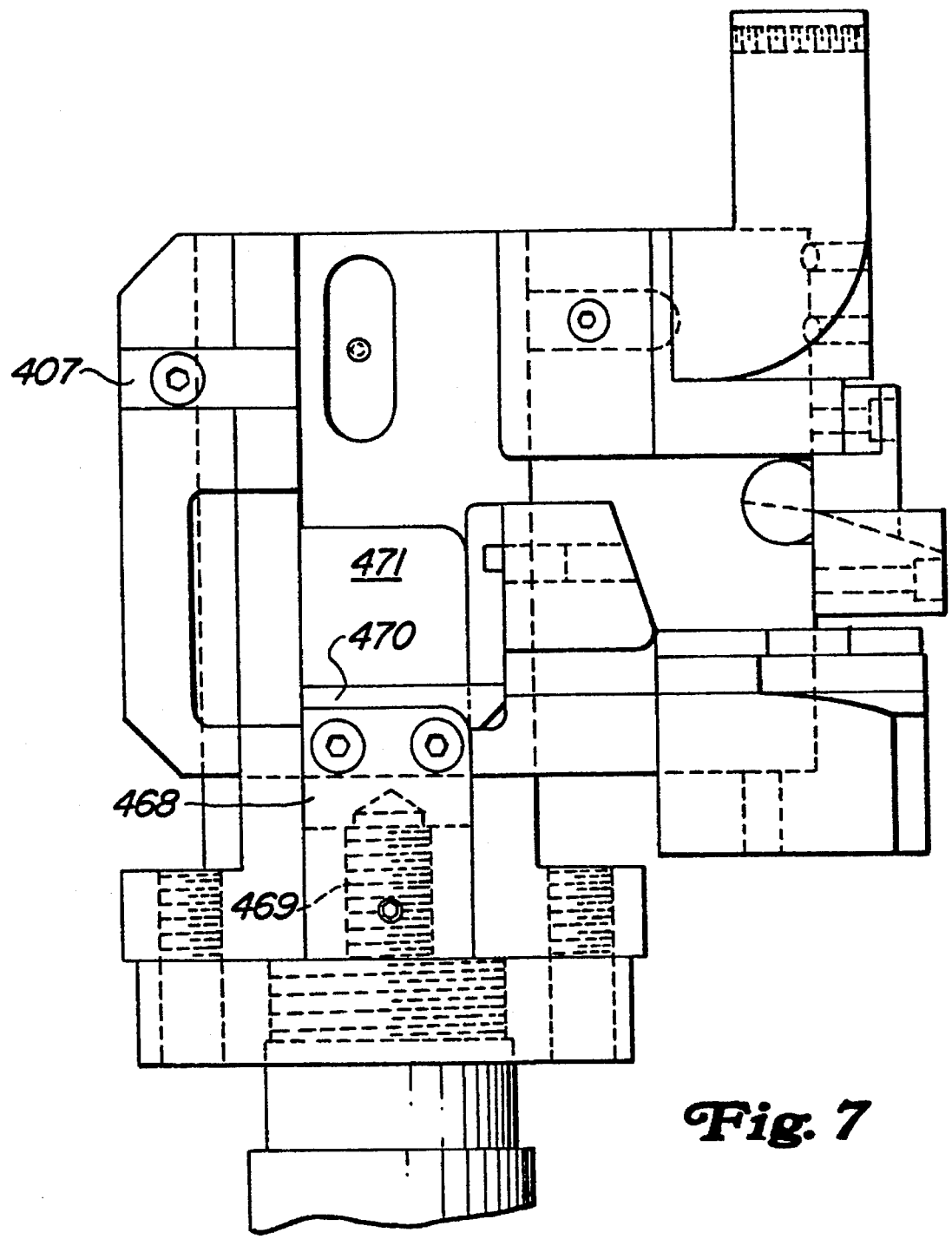
FIG. 7 is a front view of the back section of the head block of the lead end nose clamp showing the cylinder rod in the retracted position and also showing how the leads of the bobbin are bent by the removable tools used in that clamp.
Figure 8:
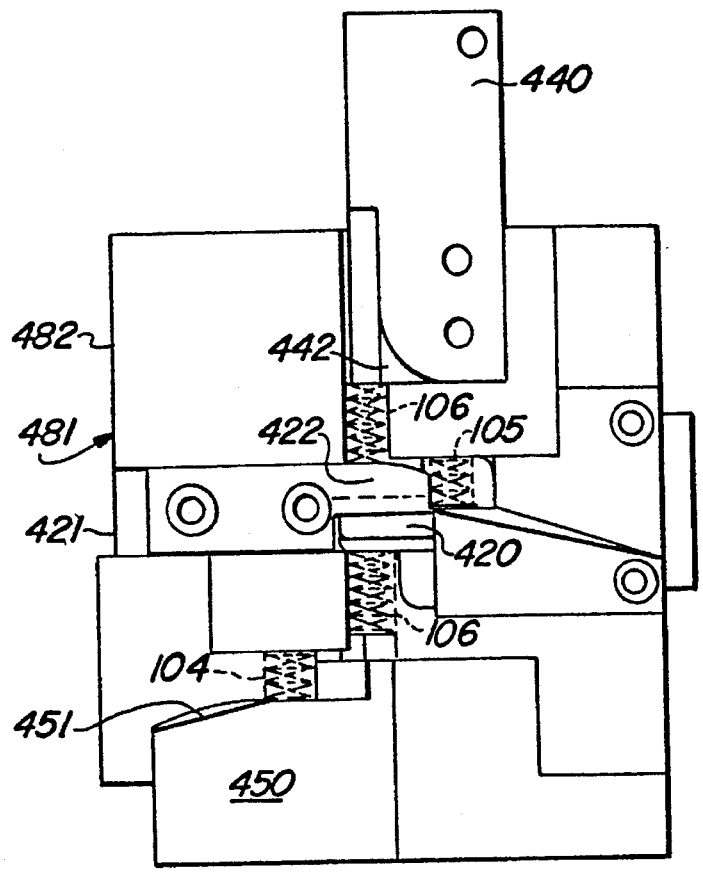
FIG. 8 is a side view of the back and front section of the head block of the lead end nose clamp in a closed position.
Figures 6, 17:
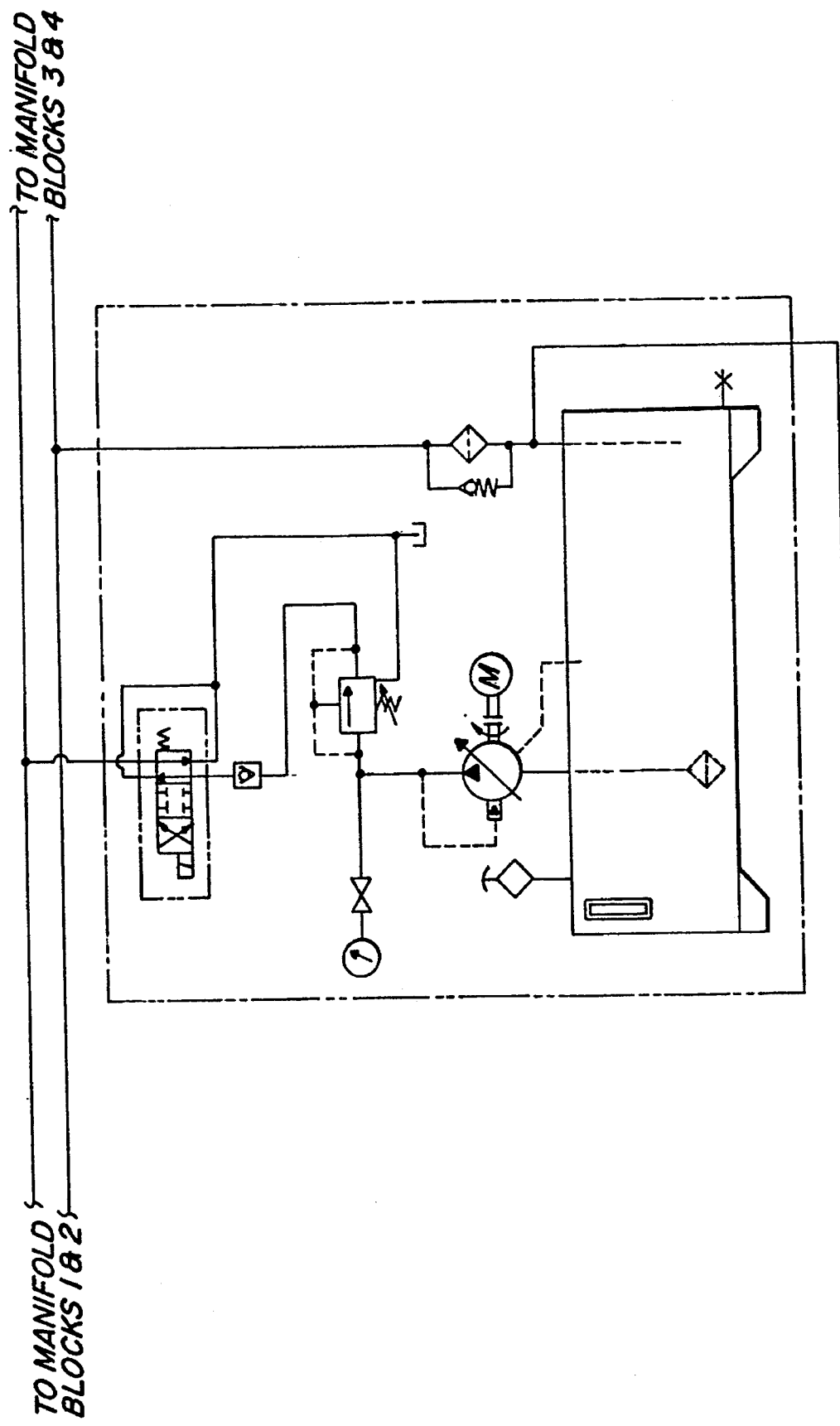

As shown in FIGS. 6–8, Lead end nose clamp 400 constitutes means for clamping the lead end nose 106 and associated lower lead 104 and upper lead 104 and for providing the desired angular turn to the lead end nose and the desired configuration of the leads. Lead end nose clamp 400 is thus used to form the lead end of the coil, and to configure the leads. Lead end nose clamp 400 includes back head block 401, and front clamping head block 481 (shown in FIG. 10) which clamps onto back head block 401 to hold the bobbin 101 in place during coil forming operation, and slide block 402, which is used to configure the leads of the bobbin.

As is shown in FIG. 6, back head block 401 includes slide block slot 403, which is adapted to receive slide block 402 in sliding arrangement therewith. Slide block 402 may be moved up and down in slide block slot 403 by a hydraulic cylinder 404 or other suitable means. Back head block 401 and slide block 402 are each provided with stop block slots 405 and 406 which are configured to receive stop block 407, which may be inserted into slots 405 and 406 and secured by a screw 408 or other suitable means to prevent slide block 402 from moving in slot 403.

Back head block 401 is provided with slot 410 for receiving lower lead 104 and is also provided with slot 411 for receiving upper lead 105. A clearance cavity defined by wall 412 is provided opposite slots 410 and 411 to provide sufficient space so that leads 104 and 105 do not strike wall 412 during the coil forming operation of apparatus 501.

Shelf 414 is provided proximate and upward of slot 410 to receive lead end nose 106. Depending on the dimensions of the bobbin, removable shelf 415 may be secured to the surface of shelf 414.

Figure 10:
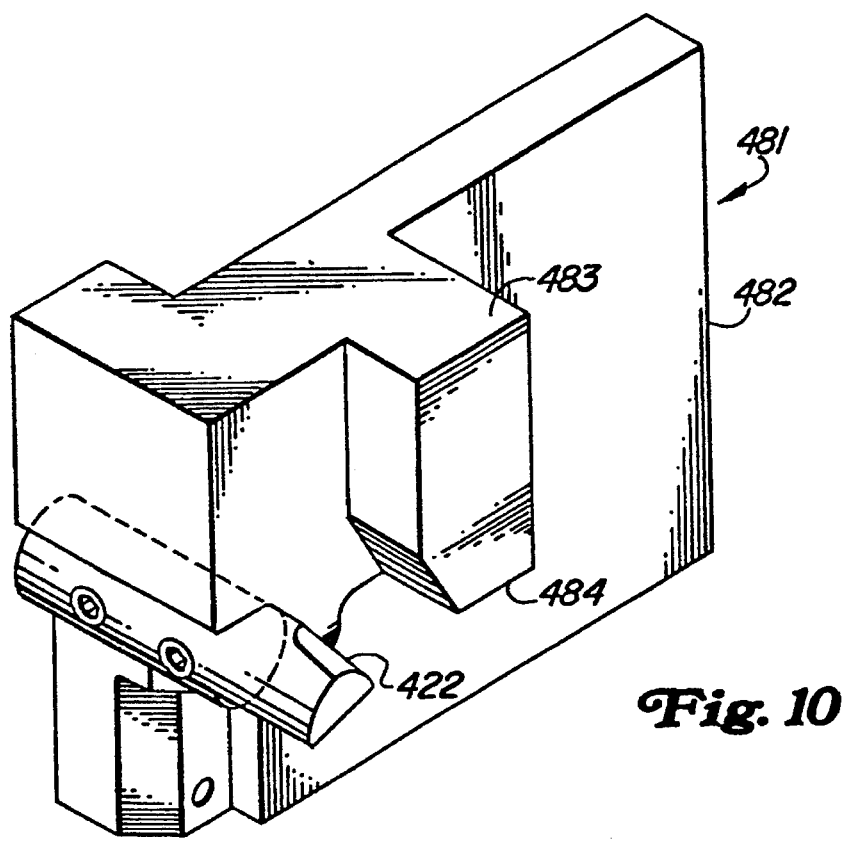
FIG. 10 is a view of the front clamping head block of the lead end nose clamp.
Figure 9:
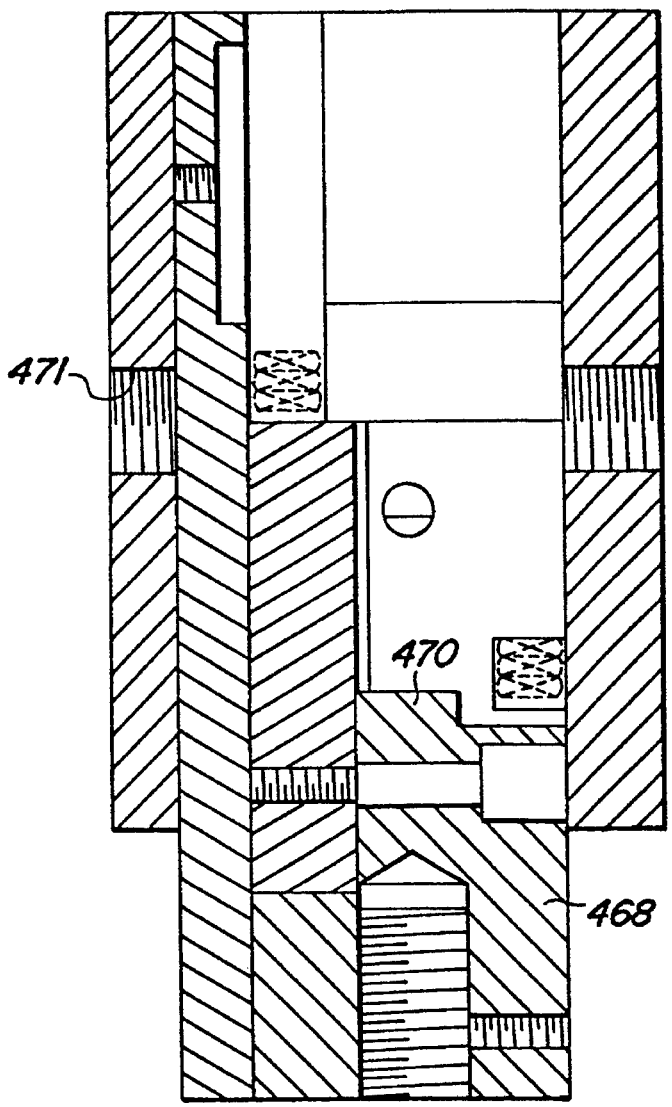
FIG. 9 is a sectional view of FIG. 6 taken along line X—X.

Lower half pin 420 of pin 421 is secured to block 401 upward of shelf 414 and removable shelf 415 a sufficient distance to provide room for the inner radius 120 of lead nose 106 to be placed around lower half pin 420 when the bobbin is initially placed in head block 400. Upper half pin 422 is secured to front clamping head block 481 as shown in FIG. 10 and mates with lower half pin 420 to form pin 421 when forming head clamp 400 is closed as shown in FIG. 8. The ends of lower half pin 420 and upper half pin 422 are rounded an amount sufficient to permit upper half pin 422 to slide into engagement with lower half pin 420 generally adjacent the inner radius 120 of lead end nose 106 without damaging the insulation of the copper wire or damaging the copper wire in the lead nose end of in bobbin 101.

Block 430 is secured to block 401 upward from lower half pin 421. The bottom portion 431 of block 401 partially defines slot 411. The side portion 432 of block 430 is generally cylindrical in shape and defines an opening when clamping block 481 is closed on block 401 for the nose end to be disposed about pin 421. The generally cylindrical shape side portion 432 provides a curved surface which aids in avoiding damage to the lead end nose 106 during coil forming operation.

Block 440 is movably mounted on the side portion 432 of block 430. Block 440 has arcuate wedge 441 extending outward from generally rounded surface 442. The arcuate wedge 441 and rounded surface contact the lead end nose 106 during coil forming operation and because of their respective configurations, do not damage the copper wire or insulation in the lead end nose 106. Block 440 may be moved up or down to accommodate bobbins having different dimensions.

Block 444 is secured to block 401 so that surface 445 is equiplanar with the surface of upper lead receiving slot 411. Surface 445 is provided with a generally curved downward slope. Surface 446, which is generally cylindrical in shape, extends upward from surface 445. Combined, surfaces 445 and 446 contact inner nose radius 106 and nose end arms 116 of bobbin 101 during coil forming operation, and the curved nature of their surfaces prevents damage to the wire or insulation of the bobbin.

Block 452 defines the upper edge of slot 410. Block 452 is secured to block 401 and may be interchanged with other similarly shaped blocks to alter the dimensions of slot 410 in accordance with the dimensions of the bobbin. Block 450 defines the lower edge of slot 410. Upper surface 451 of block 450 which defines slot 410 is widest at the end farthest from slide block slot 403, and that end is rounded and somewhat downwardly curved at the end furthest from slot 411. Upper surface 451 gradually narrows in an arcuate manner so that the narrowest part is the part closest to the slide block slot 403.

Slide block 402 is adapted to slide in slide block slot 403. Slide block 402 includes back wall 460. Side wall 461 projects at right angles from back wall 460 and is spaced from one side to define a lip 462 that fits in sliding engagement with Slot 463 in block 401. The outer edge of wall 461 is configured to define a clearance cavity for the leads of the bobbin in conjunction with wall 412 of back head block 401 when slide block 402 is in its upper most position in back head block 401.

Slide block 402 also includes base plate 464, which is adapted to be secured to cylinder head 465. Flange 466 of block 401 is disposed perpendicular to base plate 464 and is adapted to butt against flange 466 of back head block 401 to stop upward movement of the slide block. Slide block 402 further includes means for securing additional tools, such as screw hole 467, for the purposes discussed below.

As mentioned above, cylinder 404 has base plate 465 secured to cylinder 404. Base plate 465 is also secured to base plate 464 of slide block 402, so that when cylinder 404 moves, it causes slide block 402 to move. Block 468 is secured to cylinder rod 469. Block 470 is secured to the back of block 468, and projects slightly upward of block 468. Optional back block 471 may be secured behind block 470. Cylinder rod 469 may advance blocks 468, 470 and 471 upward with respect to cylinder 404 and the attached slide block 402. Cylinder 404 is free floating, so when cylinder rod 469 is activated, it exerts a force on cylinder 404 and causes it and the slide block 402 attached to it to move in the opposite direction. Flange 472 of cylinder rod block 470 is adapted to restrict the downward movement of slide block 402 by striking flange 466 of block 401.

Front clamping head block 481 includes a cover plate 482, lead guide block 483 which is adapted so that its lower side 484 define the upper side of a portion of slot 411 when upper clamping head block closes on back head block 401. Half pin 422 is secured to cover plate 482 in such a manner that when clamping head block closes on back head block 401, half pin 422 mates with half pin 420 to form pin 421. The end of half pin 422 is rounded so that if half pin 422 touches inner nose radius 120 of inner lead end nose 106, the copper wire will slide off of the head of half pin 422 and neither the copper wire nor the insulation on the wire in that part of the bobbin will suffer any damage. Portion 485 of the end of cover plate 482 proximate to half pin 422 is generally cylindrically shaped so that the arm of the bobbin wire in proximity thereto during coil forming operation will not suffer any damage.

One example of how the leads can be bent to their desired shape can be appreciated from a comparison of FIGS. 6, 7 and 8. FIG. 7 shows the position of tools 468, 470 and 471 when cylinder rod 469 is in a retracted position. FIGS. 6 and 8 show the position of the same tools when cylinder rod 469 is in an extended position. When stop block 407 is inserted into slots 405 and 406, slide block 402 cannot move. When cylinder rod 469 is activated, it drives tools 468, 470 and 471 upward, and those tools bend lead wires 104 and 105 which are maintained in position in slots 410 and 411 and which project into the cavity into which tools 468, 470 and 471 are driven, Referring back to FIG. 5, opposite lead end nose clamp assembly 507 includes tower frame 580 which is provided with tracks 581 and drive shaft means 582. Tower frame 580 includes a track riding unit 583 which is mounted in driving relationship on drive shaft means 584, which may be a screw or other suitable means known to those skilled in the art, and which is used to move tower frame toward or away from pivot point 520, depending on the dimensions of the bobbin. Encoding means, not shown but known to those skilled in the art, are disposed in tower frame 580 to indicate its position relative to pivot point 520.

Tower drive unit 590 is mounted in driving relationship with drive shaft means 582 and includes slot units 591 in locked sliding engagement with tracks 581. Tower drive unit 590 thus may be moved up and down tower frame 580 along the "X" axis, which runs through drive shaft 582. Position encoding means, not shown but known to those skilled in the art, are disposed to indicate the position of tower drive unit 590 on tower frame 580.

Tower drive unit 590 also includes a rotational drive shaft 593 mounted generally transverse to drive shaft means 582 and mounted parallel to the axis through pivot 520. Opposite lead end nose clamp housing 594 is rotationally mounted on rotational drive shaft 593. Lead end nose clamp housing 594 includes a hydraulic cylinder 595 or other suitable means for opening and closing upper clamping head block 601 on opposite lead end nose clamp 600. Position encoding means, not shown but known to those skilled in the art, are disposed to indicate the angular degree to which opposite lead end nose clamp housing assembly is rotated.

Figure 11:
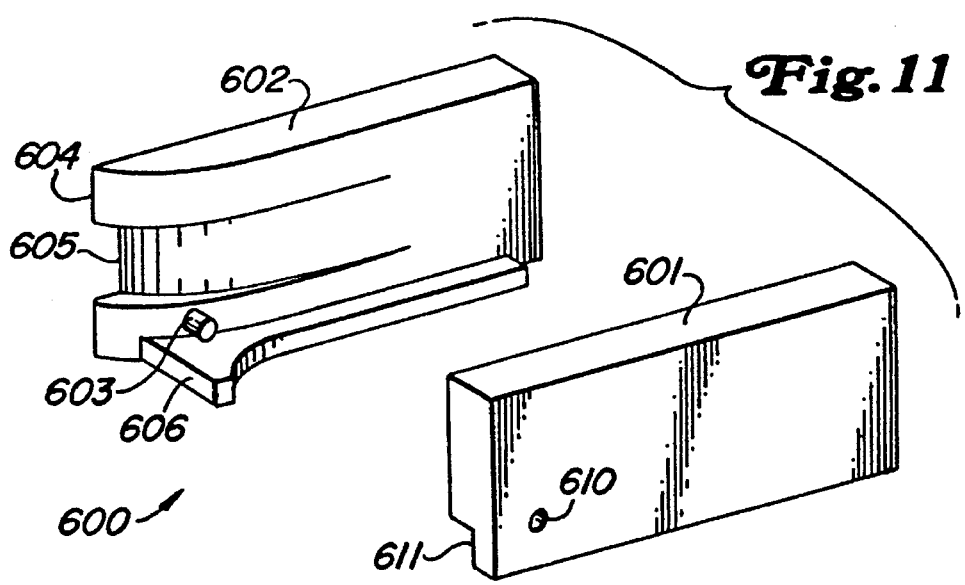
FIG. 11 is an elevational view of the opposite lead end clamp.
Figure 9A:
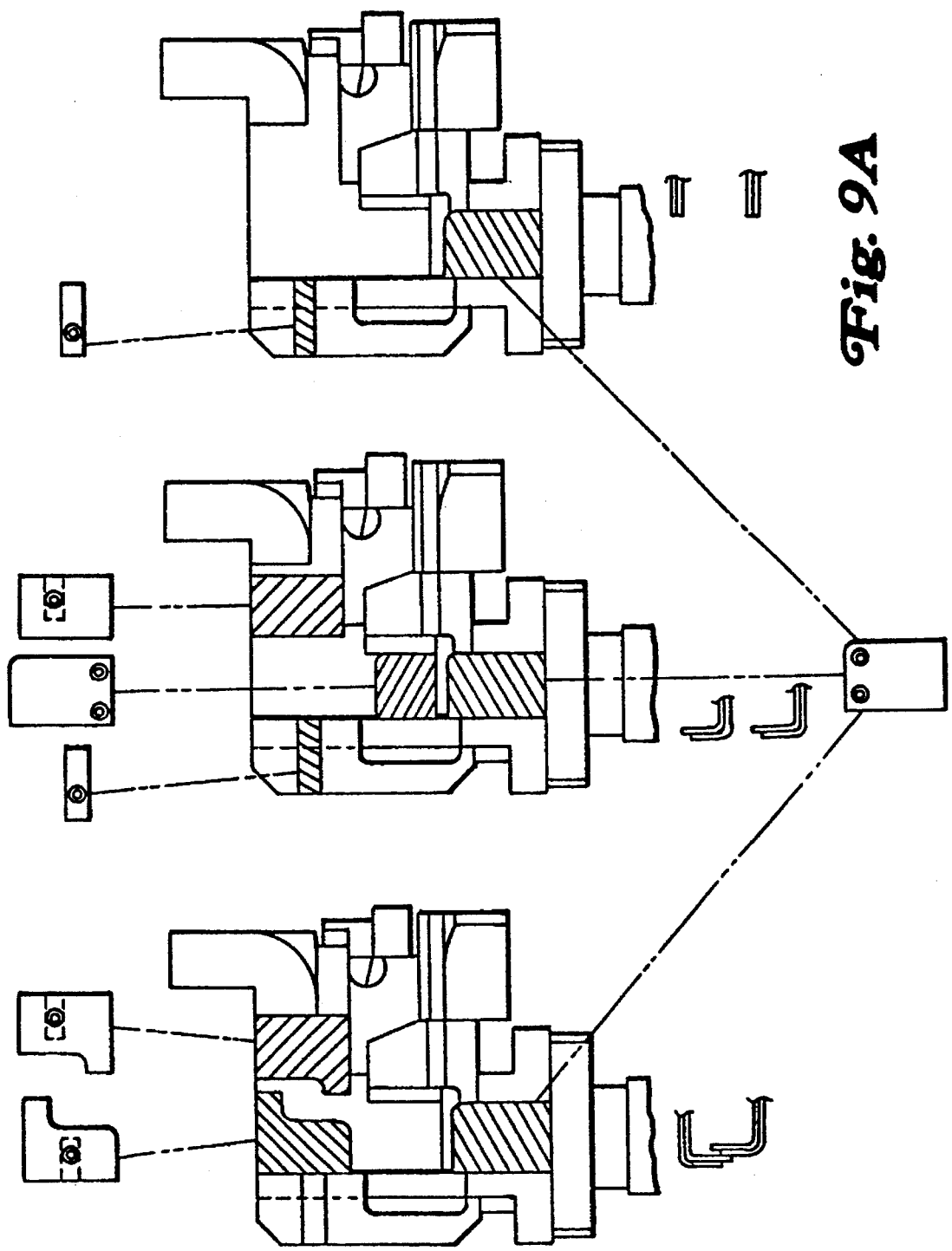
FIG. 9A is a front view of the back section of the lead end nose clamp which shows three side views of the lower head block of the lead end nose clamp with the removable lead bending parts darkened to demonstrate those parts and to show the lead configurations that they produce.

As is shown in FIG. 11, opposite lead end clamp 600 includes upper plate 601 and lower plate 602. Lower plate 602 includes pin 603 which is rounded at its end. Lower plate 602 has a generally cylindrical surface 604 at the end that is disposed closest to pivot 520, and has a cutout 605 to define a cavity into which arm 117 of bobbin 101 may fit when bobbin 101 is placed in the clamp. Shelf 606 is disposed underneath and spaced from pin 603 and provides a shelf on which arm 112 of bobbin 101 may rest when bobbin 101 is placed in the clamp. Upper plate 601 has a hole 610 adapted to receive pin 603 and has a cutout 611 adapted to define a space in conjunction with lower plate 602 in which arm 112 rests when bobbin 101 is placed in the clamp.

When the coil forming apparatus of this invention is operated, all clamps are open so that the bobbin may be properly placed in the clamps. As is described below, bobbin dimensions are provided to a control system, and the control system activates the means that turn drive shafts 564 and 584 which move tower frames 560 and 580, and therefore lead end clamp 400 and opposite lead end clamp 600 are moved into position so that opposite lead end nose 107 is placed in opposite nose end clamp 600 such that inner radius 121 of opposite lead end nose is placed snugly adjacent pin 603 and lead end nose 106 may be placed over lower half pin 120 and the leads set in slots 410 and 411. Straight length portion 115 of upper leg 103 of bobbin 101 is placed in upper leg clamps 531 which are disposed so that the rear face of each clamp 531 holds the outer edge of straight length portion 115 and the radius forming block 791 (FIGS. 12*b* and 18) is positioned to form the radii in the coil between the straight edge portion 115 and the nose end arms 116 and 117. Similarly, straight length portion 110 of lower leg 102 of bobbin 101 is placed in lower leg clamps 551 which are disposed so that the straight face 722 of each clamp 551 holds the outer edge of straight length portion 110 and the radius forming block 725 is positioned to form the radii in the coil between the straight edge portion and the nose end arms 111 and 112.

As is mentioned above upper and lower leg clamps 531 and 551 are equipped with radius forming blocks, which create the radii at the end of each straight end portion of each leg.

To spread the bobbin to form the coil, tower frame 510 which contains the upper clamp assembly, is pivoted outward to a prescribed angle about pivot 520, and tower frame 540, which contains the lower clamp assembly, is pivoted in the opposite direction to a prescribed angle about pivot 520. Thus, the bobbin legs are spread apart and are turned at the angle to which the tower frames are rotated. Pivot point 520 is located at the same distance from the bobbin legs in the clamps as the distance from the slots in the stator core in which the coil will be place is from the center of the stator core. Thus, the legs of the coil are positioned by the apparatus so as to fit exactly in the stator core.

As mentioned above, the lead end clamp 400 and opposite lead end clamp 600 hold the lead end nose and the opposite lead end nose. The assemblies which hold those clamps are allowed to free float during the operation which spreads the legs of the bobbin, except that about 15 pounds of pressure is applied by hydraulic means in an outward direction along axis "A" (shown in FIG. 5). Thus, when the legs of the bobbins are spread, lead end clamp 400 and opposite lead end clamp 600 are pulled toward the pivot point 520 of apparatus 501. When the legs of the bobbin are spread to the prescribed distance, nose end clamps 400 and 600 are rotated by drives 573 and 593 to give the noses the prescribed angle. In addition, if it is desired to raise either nose to bend it outward from the center of the stator core to form clearance for a rotor to be inserted after the coils are placed in the slots of the core, either assembly 570 or assembly 590 may be moved upward by drives 562 or 582.

Figure 15:
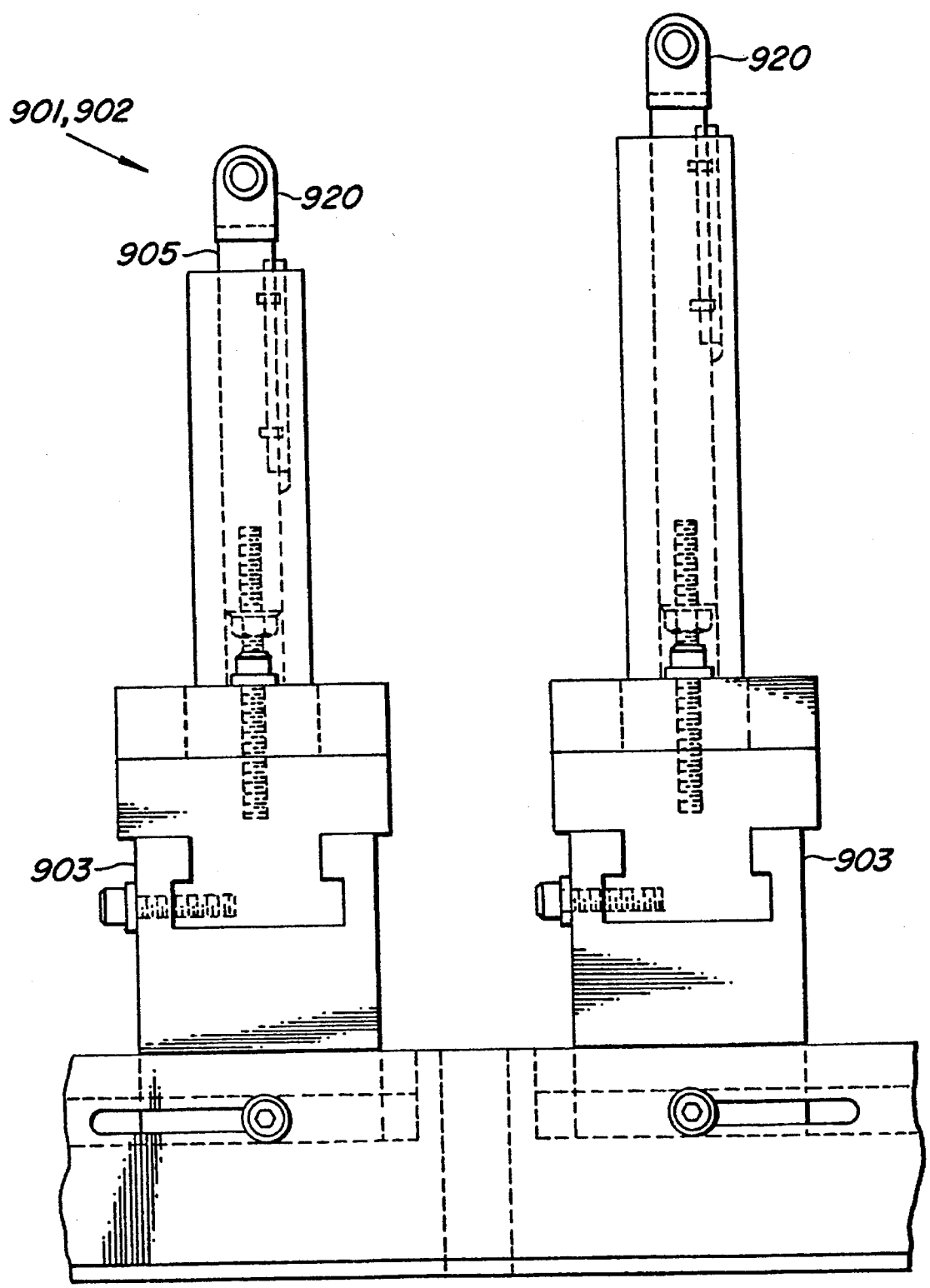
FIG. 15 is a front view of the arc formers for the nose end arms of the bobbin.
Figure 16:
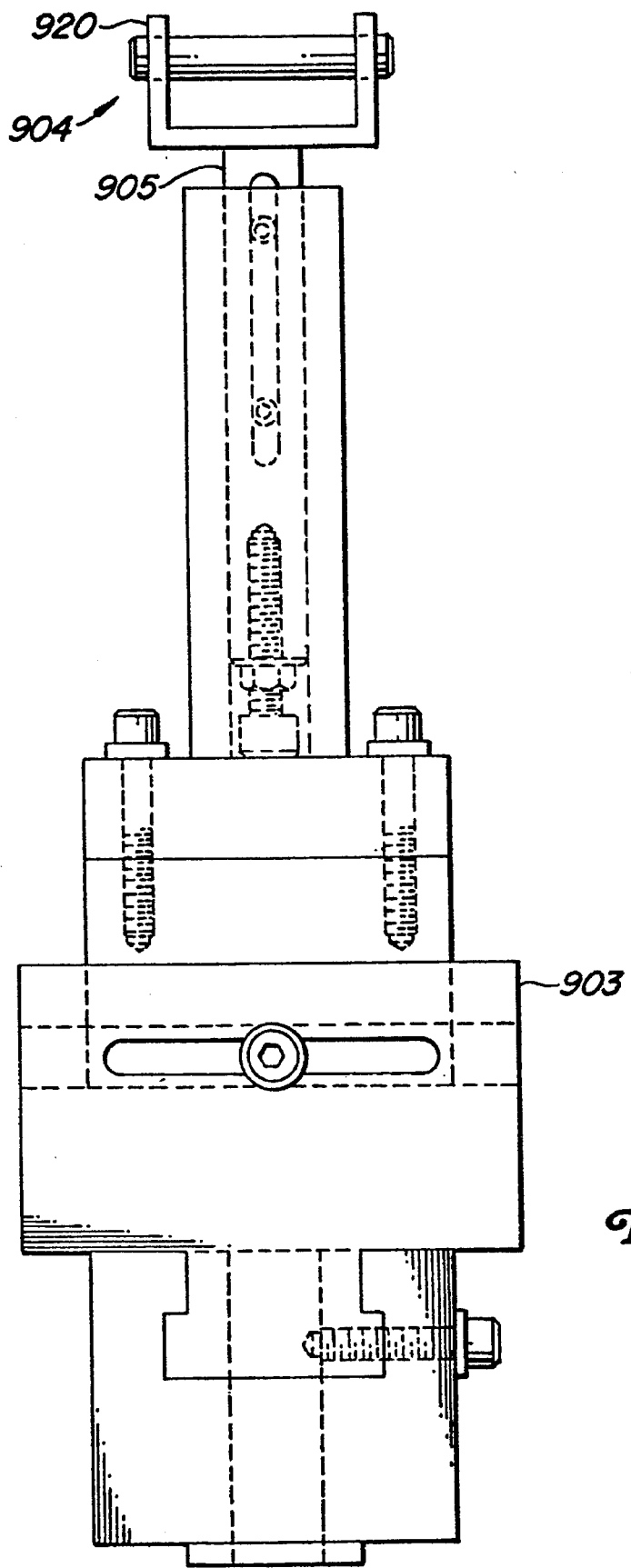
FIG. 16 is a side view of the arc formers for the nose end arms of the bobbin.

Finally, arc formers 901 and 902 shown diagrammatically in FIGS. 5 and shown in more detail in FIG. 5A and FIGS. 15 and 16, engage the arms of the bobbin and provide them with the desired radius. Visual position indication means or automated position encoding means, not shown but known to those skilled in the art, are disposed to indicate the position of the arc formers along the "A" and "B" axis. As is shown in FIGS. 15 and 16, arc formers 901 and 902 each consist of means 903 for engaging the tracks along the "A" and "B" axis shown in FIG. 5 for moving the arc formers along axis "A" and axis "B". It further consists of nose arm engaging means 904 for engaging the nose end arms. Each nose engaging means includes a cradle 920 mounted so that the surface of the cradle may engage with the nose arm. Rod 905 is engaged with suitable driving means, such as hydraulic means, for extending cradle 920 into a holding relationship with the nose arm and for bending the nose arm to the prescribed radius. Each arc former is positioned so that it engages its respective nose arm in a position to create a radius of the desired shape and configuration, as may be appreciated by those skilled in the art.

FIGS. 2–4 aid in understanding the operations of the apparatus described above. Each of upper leg clamps 531 and lower leg clamps 551, which spread legs 102 and 103, has a straight portion which is secured at the ends 110A and 110B and 115A and 115B of the straight end portions of the lower and upper legs 102 and 103 of the bobbin. Each of those clamps also has a radius forming portion which is positioned to form radii 130, 131, 132 and 133 when the legs are spread apart. Also, after the legs are spread to their predetermined position, arc formers engage coil nose arms 134, 135, 136 and 137 to form arcs 138 and 139, as can be seen by FIG. 4, which is an end view of the coil.

Lead nose end clamp 400 also forms outer nose radii 144 and 145 at the nose ends of nose end arms 134 and 135 and forms outer nose radii 146 and 147 of leads 105 and 104.

FIG. 3 shows the "drop" (the degree to which the arms are bent away from the stator core) which is formed after the legs are spread to their predetermined position by raising at least one nose end. The nose ends may be raised by raising lead nose end clamp 400 and/or opposite lead nose end clamp 600 (see FIG. 5). The nose end clamps also provide angular rotations 141 and 142 of nose ends 106 and 107 of the coil.

Thus, the apparatus of this invention can convert a bobbin to a finished formed stator coil in about 45 seconds.

The various means for moving the clamps in apparatus 501 may be powered by any suitable means. FIGS. 17-1 through 17-6 disclose one suitable hydraulic system which may be used, as will be understood by those skilled in the art. That system may be controlled by any suitable automatic control system. One suitable control system is a Mark Century 2000 Computer Numerical Control manufactured by the General Electric Company, which is a standard computer system for industrial applications. It may be programmed by those skilled in the art to control the movements of the clamps in the desired manner. One such program is attached to this specification.

As shown in FIG. 17-1, the encoders provide position feedback to the Mark Century 2000 Control, which provides commands to operate the valves in the hydraulic system.

We claim:

1. A method for forming a form wound stator coil from a bobbin having a lower leg including a straight length arm and two nose end arms, and an upper leg including an upper leg straight length portion and two nose end arms, a lead end nose defining a lead end inner nose radius, an opposite lead end nose defining an opposite lead end inner nose radius, and leads comprising a. clamping the lower and upper legs of the bobbin proximate to the opposite ends of their straight length portions to maintain the straight length portions to predetermined dimensions, b. clamping the lead end nose, the leads, and the opposite lead end nose;

c. rotating the lower and upper legs outward to a. predetermined angular relationship from one another about an axis equivalent to the center axis of the stator core into which the finished coil will be inserted and at the same time forming a radius of predetermined dimensions between the straight length portion and the lower leg nose end arms;

forming radii between the lead end and opposite lead end noses and the upper and lower nose end arms proximate to said noses;

d. rotating said noses to a predetermined angle; and e. raising said noses to bend them outward from the center of the stator core to form clearance for a rotor to be inserted after the coils are placed in the slots of the core.

2. The method of claim 1 further comprising forming radii on the upper and lower nose end arms.

3. The method of claim 2 further comprising forming the leads to a predetermined configuration.

4. The method of claim 1 further comprising rotating the lower and upper legs outward to a predetermined angular relationship from one another in a smooth, continuous motion to minimize degradation of the copper wire in the bobbin.

* * * * *